United States Patent
Chu et al.

(10) Patent No.: US 10,438,085 B2
(45) Date of Patent: Oct. 8, 2019

(54) IMAGE ANALYSIS APPARATUS, IMAGE ANALYSIS METHOD, AND STORAGE MEDIUM

(71) Applicants: Tsz Tat Chu, Tokyo (JP); Mayuko Yamaura, Kofu (JP)

(72) Inventors: Tsz Tat Chu, Tokyo (JP); Mayuko Yamaura, Kofu (JP)

(73) Assignees: Tsz Tat Chu, Tokyo (JP); Mayuko Yamaura, Kofu-Shi (JP)

( * ) Notice: Subject to any disclaimer, the term of this patent is extended or adjusted under 35 U.S.C. 154(b) by 0 days.

(21) Appl. No.: 15/263,592

(22) Filed: Sep. 13, 2016

(65) Prior Publication Data
US 2017/0083782 A1 Mar. 23, 2017

(30) Foreign Application Priority Data
Sep. 17, 2015 (JP) .................................. 2015-183788

(51) Int. Cl.
*G06K 9/46* (2006.01)
*G06K 9/00* (2006.01)
*G06Q 30/06* (2012.01)

(52) U.S. Cl.
CPC ........... *G06K 9/46* (2013.01); *G06K 9/00362* (2013.01); *G06K 9/00624* (2013.01);
(Continued)

(58) Field of Classification Search
None
See application file for complete search history.

(56) References Cited

U.S. PATENT DOCUMENTS

2008/0240563 A1* 10/2008 Takano .............. H04N 5/23219
382/173
2009/0106208 A1* 4/2009 Matellanes ....... G06F 17/30734
(Continued)

FOREIGN PATENT DOCUMENTS

JP 2015503143 A 1/2015

OTHER PUBLICATIONS

Rabinovich, Andrew, et al. "Objects in context." Computer vision, 2007. ICCV 2007. IEEE 11th international conference on. IEEE, 2007. 10 pages.*

(Continued)

*Primary Examiner* — Ryan P Potts
(74) *Attorney, Agent, or Firm* — Perspectives Law Group, Corp.

(57) ABSTRACT

One or more pieces of product information each having a product identifier and specifying image information are stored in a product information storage unit. A product identifier acquiring unit detects, at least two images that are to be analyzed, that there are images of products corresponding to one or more pieces of product specifying image information, using the stored pieces of product specifying image information, and acquires one or more product identifiers corresponding to the images of the products. A personal attribute value acquiring unit acquires one or more personal attribute values from the least two images that are to be analyzed, and a personal attribute value-related information accumulating unit accumulates the one or more product identifiers acquired by the product identifier acquiring unit and personal attribute value-related information, in association with each other, the product identifiers and the personal attribute values being information acquired from a same image.

17 Claims, 25 Drawing Sheets

(52) U.S. Cl.
CPC ..... *G06Q 30/0643* (2013.01); *G06K 2209/25* (2013.01); *G06T 2207/10004* (2013.01)

(56) References Cited

U.S. PATENT DOCUMENTS

| | | | | |
|---|---|---|---|---|
| 2013/0114864 | A1* | 5/2013 | Garcia | H04N 7/173 382/118 |
| 2014/0037198 | A1* | 2/2014 | Larlus-Larrondo | G06K 9/00 382/159 |
| 2016/0171707 | A1* | 6/2016 | Schwartz | G06K 9/00201 382/180 |

OTHER PUBLICATIONS

Loui, Alexander, et al. "Kodak's consumer video benchmark data set: concept definition and annotation." Proceedings of the international workshop on Workshop on multimedia information retrieval. ACM, 2007. 10 pages.*
Chen, Huizhong, Andrew Gallagher, and Bernd Girod. "Describing clothing by semantic attributes." European conference on computer vision. Springer, Berlin, Heidelberg, 2012. 20 pages.*
URL:https://twitter.com/.

* cited by examiner

| Product identifier | Product specifying image information |
|---|---|
| Heineke* | Feature 1a, feature 1b, ••• |
| Coron* | Feature 2a, feature 2b, ••• |
| ⋮ | ⋮ |

FIG.9

| Personal attribute value | Feature |
|---|---|
| Man | Feature 3a, feature 3b, ••• |
| Woman | Feature 4a, feature 4b, ••• |
| ⋮ | ⋮ |

FIG.10

| Object identifier | Feature |
|---|---|
| Curtain | Feature 5a, feature 5b, ••• |
| Bar counter | Feature 6a, feature 6b, ••• |
| ⋮ | ⋮ |

FIG.11

| Location type identifier | Object identifier |
|---|---|
| Home | Curtain, home appliance,··· |
| Pub | Bar counter, illumination,··· |
| ⋮ | ⋮ |

FIG.12

| Event type identifier | Product identifier, personal attribute value, location type identifier, object identifier,... |
|---|---|
| Girls' night out | Woman, two or more people,... |
| Birthday party | Home, birthday cake,... |
| ⋮ | ⋮ |

FIG.13

| Product identifier | Personal attribute-related information |
|---|---|
| Heineke* | Woman, 20s, two people, Asian, ••• |
| Coron* | Woman, 20s, two people, Asian, ••• |
| ⋮ | ⋮ |

FIG.14A

| Product identifier | Personal attribute-related information |
|---|---|
| Heineke*, Coron* | Woman, 20s, two people, Asian, ••• |
| ⋮ | ⋮ |

FIG.14B

| Product identifier | Location type-related information |
|---|---|
| Heineke* | Home, indoor, girls' night out, ••• |
| Coron* | Home, indoor, girls' night out, ••• |
| ⋮ | ⋮ |

FIG.15A

| Product identifier | Location type-related information |
|---|---|
| Heineke*, Coron* | Home, indoor, girls' night out, ••• |
| ⋮ | ⋮ |

FIG.15B

IMAGE ANALYSIS APPARATUS, IMAGE ANALYSIS METHOD, AND STORAGE MEDIUM

CROSS-REFERENCE TO RELATED APPLICATION

This application claims priority to Japanese Patent Application No. 2015-183788, filed Sep. 17, 2015.

FIELD OF THE INVENTION

The present invention relates to an image analysis apparatus and the like for analyzing an image and accumulating obtained information.

BACKGROUND

Conventionally, among images (still images or moving images) uploaded to SNS (social networking service) by users, there are many images containing product images, each of which is an image of a product. Many images on SNS are associated with, for example, text containing keywords or tags, and thus a search using keywords and the like can be performed (see "Twitter", accessed on Jul. 28, 2015 at: twitter.com/, for example).

Thus, it is conceivable to accumulate information indicating a relationship between products and consumer attributes, for example, indicating which sex, which age group, which race, or the like more consumers who purchased a certain product belong to, using images on SNS, and to use the accumulated information for, for example, analysis of consumer behavior, market research, and the like.

One method for realizing that processing is a method for analyzing text attached to images. However, the proportion of images associated with text with which a product can be identified, with respect to images containing product images, is not large, and, furthermore, problems such as the language barrier or spam make it difficult to analyze text and accumulate this type of information.

Another method for realizing that processing is a method for analyzing images themselves. Image analysis has raised expectations as a method for accumulating this type of information from many of the images containing product images.

SUMMARY OF THE INVENTION

It is an object of the present invention to provide an image analysis apparatus and the like capable of analyzing an image and accumulating at least information indicating a relationship between products and personal attributes.

A first aspect of the present invention is directed to an image analysis apparatus, including: a product information storage unit in which one or more pieces of product information each having a product identifier for identifying a product and product specifying image information, which is information on an image that specifies the product, can be stored; a product identifier acquiring unit that detects, from one or at least two images that are to be analyzed, that there are images of products corresponding to one or more pieces of product specifying image information, in any of the one or more images, using the stored one or more pieces of product specifying image information, and acquires product identifiers corresponding to the images of the products; a personal attribute value acquiring unit that acquires one or more personal attribute values, each of which is an attribute value of a person in an image, from the one or at least two images that are to be analyzed; and a personal attribute value-related information accumulating unit that accumulates the one or more product identifiers acquired by the product identifier acquiring unit and personal attribute value-related information, which is information related to the one or more personal attribute values acquired by the personal attribute value acquiring unit, in association with each other, the product identifiers and the personal attribute values being information acquired from a same image.

With this configuration, it is possible to accumulate at least information indicating a relationship between products and personal attributes.

Furthermore, a second aspect of the present invention is directed to the image analysis apparatus according to the first aspect, further including: a location type identifier acquiring unit that acquires a location type identifier for identifying the type of location in an image, from the one or at least two images that are to be analyzed; and a location type-related information accumulating unit that accumulates location type-related information, which is information related to the location type identifier, in association with a product identifier paired with the product specifying image information.

With this configuration, it is also possible to accumulate information indicating a relationship between products and the types of locations.

A third aspect of the present invention is directed to the image analysis apparatus according to the first aspect, wherein the product identifier acquiring unit determines, on the one or at least two images that are to be analyzed, whether or not there is an image of a product corresponding to the product specifying image information, in any of the one or more images, using the stored product specifying image information, the personal attribute value acquiring unit acquires one or more personal attribute values, each of which is an attribute value of a person, in an image determined by the product identifier acquiring unit that there is an image of a product corresponding to the product specifying image information, and the personal attribute value-related information accumulating unit accumulates personal attribute value-related information, which is information related to the one or more personal attribute values acquired by the personal attribute value acquiring unit, in association with a product identifier paired with the product specifying image information from which the product identifier acquiring unit has determined that there is an image of a product corresponding to the product specifying image information.

With this configuration, it is possible to accumulate information indicating a relationship between products and at least personal attributes.

Furthermore, a fourth aspect of the present invention is directed to the image analysis apparatus according to the first aspect, wherein two or more pieces of product information are stored in the product information storage unit, the product identifier acquiring unit determines, on one image that is to be analyzed, whether or not there are images of two or more products corresponding to the two or more pieces of product specifying image information, in that one image, using the two or more pieces of product specifying image information in the product information storage unit, and the personal attribute value acquiring unit acquires one or more personal attribute values, in an image determined by the product identifier acquiring unit that there are images of two or more products, and the personal attribute value-related information accumulating unit accumulates personal attribute value-related information, which is information related to the one or more personal attribute values acquired by the personal attribute value acquiring unit, in association with two or more product identifiers paired with the two or more pieces of product specifying image information from which the product identifier acquiring unit has determined that there are images of two or more products.

With this configuration, it is possible to accumulate information indicating not only a relationship between products and personal attributes or the like but also a relationship between products.

Furthermore, a fifth aspect of the present invention is directed to the image analysis apparatus according to the first aspect, further including: an image acquiring unit that acquires one or more images from one or at least two server apparatuses in which CGM data on the Web is stored, wherein the one or more images that are to be analyzed are the images acquired by the image acquiring unit.

With this configuration, it is possible to analyze one or more images attached to CGM data on the Web, and to accumulate information indicating a relationship between products and personal attributes or the like.

Furthermore, a sixth aspect of the present invention is directed to the image analysis apparatus according to the fifth aspect, wherein the image acquiring unit acquires one or more moving images from one or at least two server apparatuses in which CGM data on the Web is stored, and the one or more images that are to be analyzed are still images constituting the moving images.

With this configuration, it is possible to analyze one or more moving images attached to CGM data on the Web, and to accumulate information indicating a relationship between products and personal attributes or the like.

Furthermore, a seventh aspect of the present invention is directed to the image analysis apparatus according to the first aspect, further including: an image storage unit in which one or more images can be stored, wherein the one or more images that are to be analyzed are the images stored in the image storage unit.

With this configuration, it is possible to analyze one or more images stored in the image storage unit, and to accumulate information indicating a relationship between products and personal attributes or the like.

According to the present invention, it is possible to analyze images, and to accumulate information indicating a relationship between products and at least personal attributes.

BRIEF DESCRIPTION OF THE DRAWINGS

FIG. 9 is a table showing an example of product information stored in a product information storage unit 111 in this example.

FIG. 10 is a table showing an example of a first correspondence table in this example.

FIG. 11 is a table showing an example of a second correspondence table in this example.

FIG. 12 is a table showing an example of a third correspondence table in this example.

FIG. 13 is a table showing an example of a fourth correspondence table in this example.

FIGS. 14A and 14B are tables showing an example of personal attribute-related information in this example.

FIGS. 15A and 15B are tables showing an example of location type-related information in this example.

DETAILED DESCRIPTION OF THE INVENTION

Figure 1:
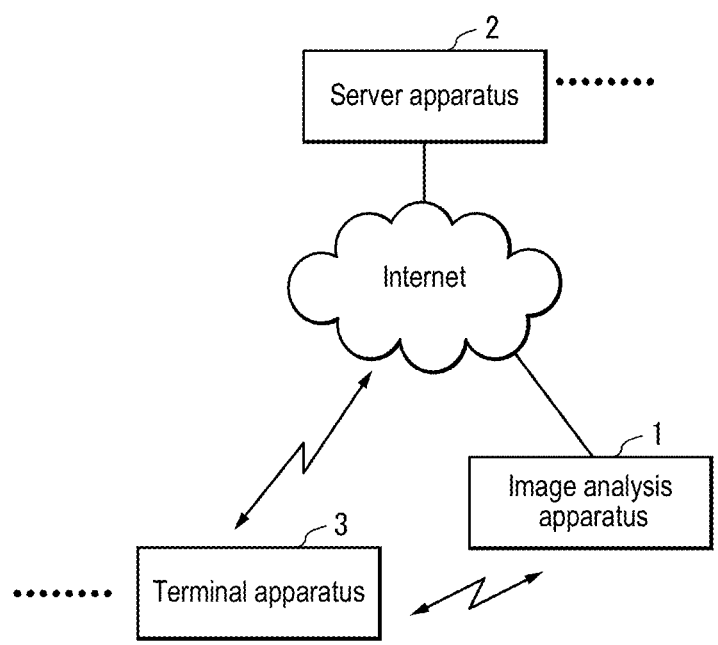
FIG. 1 is a conceptual diagram of an image analysis system including an image analysis apparatus 1 in Example 1.

Hereinafter, examples of an image analysis apparatus and the like will be described with reference to the drawings. It should be noted that constituent elements denoted by the same reference numerals in the examples perform similar operations, and thus a description thereof may not be repeated.

EXAMPLE 1

FIG. 1 is a conceptual diagram of an image analysis system including an image analysis apparatus 1 in this example. This image analysis system is configured by one or at least two server apparatuses 2 and one or at least two terminal apparatuses 3 that can be connected via the Internet to the server apparatuses 2. The terminal apparatuses 3 can be connected to the image analysis apparatus 1, for example, via the Internet. Note that the image analysis apparatus 1 and the terminal apparatuses 3 may be connected to each other, for example, via a wired or wireless LAN or peer-to-peer.

In the server apparatuses 2, CGM data on the Web can be stored. CGM is an abbreviation for consumer generated media, and refers to media in which consumers generate the content using the Internet or the like.

In the server apparatuses 2, CGM data to which one or at least two images are attached is stored, and the image analysis apparatus 1 is connected via the Internet to the server apparatuses 2, and acquires one or at least two images attached to the CGM data, from the server apparatuses 2.

The images that are to be analyzed may be one or at least two images acquired from an external apparatus other than the server apparatuses 2, or may be one or at least two images stored in an internal memory, a hard disk, or the like, and there is no limitation on the source from which the images are acquired. The acquired images may be moving images, and, in this case, the images that are to be analyzed are still images constituting the moving images.

The image analysis apparatus 1 analyzes one or at least two images, acquires a product identifier of a product in the images and one or more personal attribute values of a person in the images, and accumulates one or more pieces of personal attribute value-related information in association with the product identifier. The image analysis apparatus 1 may acquire a location type identifier as well from an object in the images, and further accumulate the one or more pieces of location type-related information in association with the product identifier. Furthermore, the image analysis apparatus 1 can acquire and accumulate correspondence information between two or more products and personal attribute values or the like, including product identifiers and one or more attribute values of a person, from one image.

The information accumulated by the image analysis apparatus 1 is output, for example, to the terminal apparatuses 3. Note that the information may be output to a display screen of the image analysis apparatus 1 itself, or may be output to an external accumulating apparatus (e.g., the server apparatuses 2), and there is no limitation on the destination to which the information is output.

Figure 2:
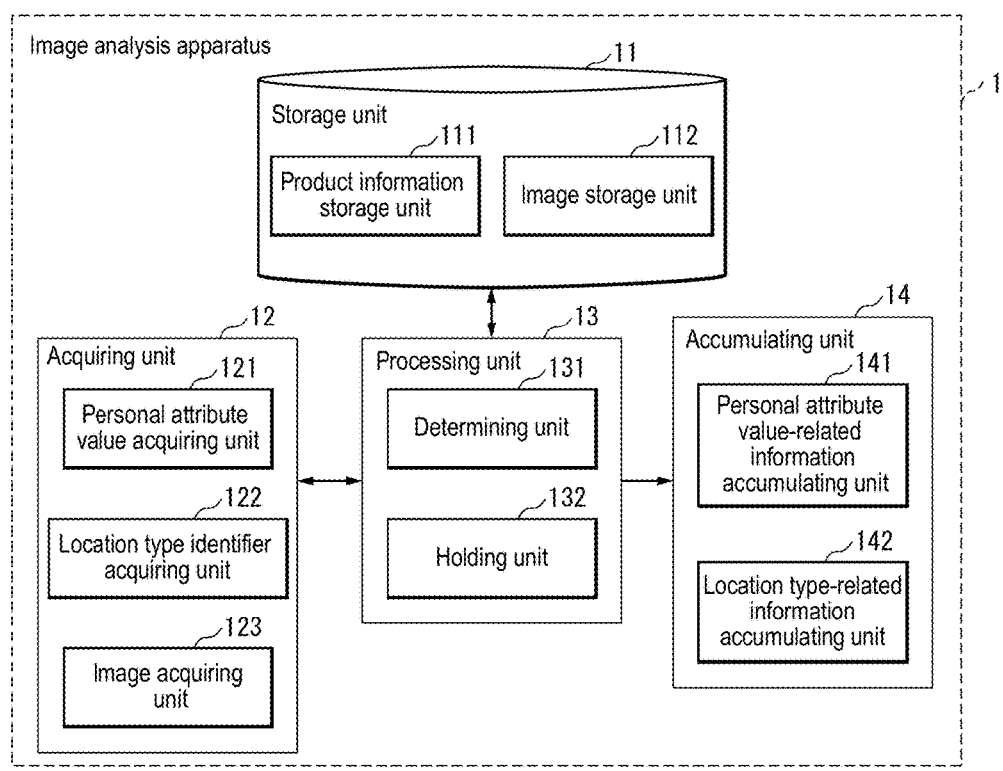
FIG. 2 is a block diagram of the image analysis apparatus 1 in this example.

FIG. 2 is a block diagram of the image analysis apparatus 1 in this example. The image analysis apparatus 1 includes a storage unit 11, an acquiring unit 12, a processing unit 13, and an accumulating unit 14.

The storage unit 11 includes a product information storage unit 111 and an image storage unit 112. The acquiring unit 12 includes a personal attribute value acquiring unit 121, a location type identifier acquiring unit 122, and an image acquiring unit 123. The processing unit 13 includes a determining unit 131 and a holding unit 132. The accumulating unit 14 includes a personal attribute value-related information accumulating unit 141 and a location type-related information accumulating unit 142.

In the storage unit 11, for example, product information (described below), one or more images that are to be analyzed, and the like can be stored.

In the product information storage unit 111, product information having a product identifier for identifying a product and product specifying image information, which is information on an image that specifies the product, can be stored.

In the product information storage unit 111, two or more pieces of product information may be stored.

In the product information storage unit 111, typically, two or more pieces of product information are stored. Note that only one piece of product information may be stored.

The product identifier is typically a brand name, an item number, or the like, but there is no limitation on the type thereof, as long as each product can be identified.

The image that specifies a product is typically a logo mark, but may also be an image of text characters indicating a brand name, an item number, or the like, an image of a bar code, or the like, and there is no limitation on the type thereof, as long as it is an image that specifies a product.

The product specifying image information is typically one or more features that can be extracted from an image of a product, but may also be an image itself. The product specifying image information is, for example, features regarding a logo mark. A logo mark is typically configured by a combination of one or more patterns or one or more text characters, and examples thereof include a pattern color-related feature, a pattern shape-related feature, a text character style-related feature, and the like. The product information may have information such as a manufacturer name, a distributor name, or the like of the product, in addition to the product specifying image information.

In the image storage unit 112, one or more images can be stored. The one or more images that are to be analyzed may be the images stored in the image storage unit 112.

The acquiring unit 12 acquires, for example, a personal attribute value (described below), a location type identifier, one or more images, and the like. The acquiring is a concept that encompasses reading from an internal memory or a hard disk, receiving information transmitted from an external apparatus (e.g., the server apparatuses 2) and broadcasted information, and the like.

The personal attribute value acquiring unit 121 acquires one or more personal attribute values, each of which is an attribute value of a person, in an image determined by the determining unit 131 that there is an image of a product corresponding to the product specifying image information.

A specific procedure for acquiring one or more personal attribute values, each of which is an attribute value of a person in an image, is, for example, as follows. The personal attribute value acquiring unit 121 first recognizes a person. The recognition of a person may be performed through face recognition. The recognition is performed, for example, following a known algorithm using the degree of similarity. Next, the personal attribute value acquiring unit 121 acquires a personal attribute value (e.g., sex, age, race, emotional expression, type of clothing that is worn, color of clothing, etc.). The personal attribute value may also be information of being a person. For example, a correspondence table between a personal attribute value and one or more features is held by the holding unit 132, and one or more personal attribute values, each of which is an attribute value of a person in an image, are acquired from this correspondence table. For example, in the case of an emotional expression, a feature regarding "delight" is held in association with an attribute value "0", a feature regarding "anger" is held in association with an attribute value "1", a feature regarding "sorrow" is held in association with an attribute value "2", and a feature regarding "pleasure" is held in association with an attribute value "3".

Note that the sex, the age, the race, and the emotional expression can be judged following a known algorithm. For example, the emotional expression can be judged, in particular, using features regarding changes in the corners of a mouth or the outer corners of eyes such as the corners of a mouth being lifted or the outer corners of eyes being lowered. In the case of judging the expression, not only the corners of a mouth or the outer corners of eyes but also features regarding various portions may be used. The color of clothing that is worn can be judged, for example, by taking a region positioned below a flesh-colored region including the face image as clothing, and judging the color in the region corresponding to the clothing. The type of clothing that is worn can be judged, for example, by dividing the region corresponding to the clothing into multiple small regions, extracting features of the small regions, and comparing the extracted features with features of each type of clothing held in advance (e.g., shape of a collar, whether or not there are buttons, etc.).

For example, in the case where one or at least two small regions positioned along the above-described flesh-colored region are taken as a collar, if the number of small regions corresponding to the collar is one, and that region has a contour in the shape of a semicircle or a V, and there is no a line constituted by multiple small regions corresponding to a button line, it is judged that the type of clothing that is worn is a T-shirt, and, if two or more small regions corresponding to the collar have a contour in the shape of a triangle or a combination of multiple triangles, and there is a line constituted by multiple small regions corresponding to a button line below the two small regions, it is judged that the type of clothing that is worn is a shirt. Note that this method is merely an example, and there is no limitation on the judging method.

If two or more pieces of product information are stored in the product information storage unit 111, the personal attribute value acquiring unit 121 acquires one or more personal attribute values, in an image determined by the determining unit 131 that there are images of two or more products.

The location type identifier acquiring unit 122 acquires a location type identifier for identifying the type of location, in an image determined by the determining unit 131 that there is an image of a product corresponding to the product specifying image information.

The location type identifier may be, for example, for identifying only whether the location is indoor or outdoor, or may be for identifying a location such as home, a pub, a baseball stadium, or the like. For example, a correspondence table between a location identifier and an object identifier and a correspondence table between an object identifier and one or more features are held by the holding unit 132, and the location type identifier is acquired using these correspondence tables. The object is typically those (objects or animals) other than people, and, in particular, it is preferable that the object is those useful for identifying the type of location. The object useful for identifying the type of location is, for example, a curtain, a bar counter, a scoreboard, and the like. The reason for this is that there may be a relationship in which the location is home if it has curtains, the location is a pub if it has a bar counter, and the location is a baseball stadium if it has a scoreboard, for example.

The image acquiring unit 123 acquires one or more images, for example, from the one or at least two server apparatuses 2 in which CGM data on the Web is stored.

CGM is an abbreviation for consumer generated media, and refers to media in which consumers generate the content using the Internet or the like. The one or more images acquired by the image acquiring unit 123 are typically still images or moving images attached to the CGM data.

The image acquiring unit 123 may acquire one or more moving images from the one or at least two server apparatuses 2 in which CGM data on the Web is stored. The server apparatuses 2 are, for example, servers of Twitter®, servers of Facebook®), servers of blogs, servers of YouTube®, servers of Niconico®, or the like. Note that there is no limitation on the type of SNS to which the server apparatuses 2 belong.

The image acquiring unit 123 may acquire one or more images, for example, from an external apparatus other than the server apparatuses 2, such as various cameras including surveillance cameras for preventing crimes, fixed cameras for observing the weather, the traffic volume, and the like, and demonstration cameras installed in appliance stores and the like, or server apparatuses in which images from various cameras are accumulated, and there is no limitation on the source from which the images are acquired.

Furthermore, the acquiring unit 12 acquires, from the product information storage unit 111, a product identifier paired with the product specifying image information from which the determining unit 131 has determined that there is an image of a product corresponding to the product specifying image information.

For example, the processing unit 13 determines whether or not there is an image of a product in the images, holds various correspondence tables and the like, and temporarily holds processing results.

The determining unit 131 determines, on the one or at least two images that are to be analyzed, whether or not there is an image of a product corresponding to the product specifying image information, in any of the one or more images, using the stored product specifying image information.

The one or at least two images that are to be analyzed are typically still images attached to the above-described CGM data, or still images in moving images attached to the CGM data.

If two or more pieces of product information are stored in the product information storage unit 111, the determining unit 131 determines, on one image that is to be analyzed, whether or not there are images of two or more products corresponding to the two or more pieces of product specifying image information, in that one image, using the two or more pieces of product specifying image information in the product information storage unit 111.

The holding unit 132 may hold a first correspondence table, which is a correspondence table between a personal attribute value (described above) and one or more features, a second correspondence table, which is a correspondence table between an object identifier and one or more features, a third correspondence table, which is a correspondence table between a location type identifier and one or more object identifiers, and a fourth correspondence table, which is a correspondence table between an event type identifier (described later), and one or more product identifiers, one or more personal attribute values, a location type identifier, one or more object identifiers, and the like, for example.

Furthermore, the holding unit 132 may temporarily hold the product identifier acquired by the acquiring unit 12, the personal attribute value acquired by the personal attribute value acquiring unit 121, the location type identifier acquired by the location type identifier acquiring unit 122, and the like.

The accumulating unit 14 accumulates, for example, personal attribute value-related information associated with a product identifier, location type-related information associated with a product identifier, and the like. The accumulating is a concept that encompasses writing to an internal memory, a hard disk, and the like, transmitting to an external accumulating apparatus (e.g., the server apparatuses 2, etc.), and the like.

The personal attribute value-related information accumulating unit 141 accumulates personal attribute value-related information, which is information related to the one or more personal attribute values acquired by the personal attribute value acquiring unit 121, in association with a product identifier paired with the product specifying image information from which the determining unit 131 has determined that there is an image of a product corresponding to the product specifying image information.

The personal attribute value-related information may be one or more personal attribute values, or may be results obtained by statistically processing one or more personal attribute values, or the like. The results obtained by statistically processing personal attribute values are, for example, the number of women, the number of people in their 20s, or the like. Also, the results may be the male-female ratio, the distribution of the numbers of people in respective age groups, or the like, and there is no limitation on the content as long as it is a result obtained by performing some statistical processing.

If two or more pieces of product information are stored in the product information storage unit 111, the personal attribute value-related information accumulating unit 141 may accumulate personal attribute value-related information, which is information related to the one or more personal attribute values acquired by the personal attribute value acquiring unit 121, in association with two or more product identifiers paired with the two or more pieces of product specifying image information from which the determining unit 131 has determined that there are images of two or more products.

The location type-related information accumulating unit 142 accumulates location type-related information, which is information related to the location type identifier, in association with a product identifier paired with the product specifying image information.

The location type-related information may be the above-described location type identifier, or may be an event type identifier for identifying the type of event that is being held at that location, or the like. The event is, for example, a girls' night out, a birthday party, a baseball game, a concert, or the like. For example, a correspondence table between an event type identifier, and one or more personal attribute values, a location type identifier, and one or more object identifiers is held by the holding unit 132, and an event type identifier is acquired from this correspondence table.

Note that the functions of the above-described units may be realized, for example, as follows. The storage unit 11 (the product information storage unit 111 and the image storage unit 112 included therein) is preferably a non-volatile storage medium, but may be realized also by a volatile storage medium. There is no limitation on the procedure in which the product information and the like are stored in the storage unit 11. For example, the product information and the like may be stored in the storage unit 11 via a storage medium, the product information and the like transmitted via a communication line or the like may be stored in the storage unit 11, or the product information and the like input via an input device may be stored in the storage unit 11. There is no limitation on the input device, and examples thereof include any device such as a keyboard, a mouse, a touch panel, a menu screen, and the like.

The acquiring unit 12 (the personal attribute value acquiring unit 121, the location type identifier acquiring unit 122, and the image acquiring unit 123), the processing unit 13 (the determining unit 131 and the holding unit 132), the accumulating unit 14 (the personal attribute value-related information accumulating unit 141 and the location type-related information accumulating unit 142) may be realized typically by MPUs, memories, or the like. Typically, the processing procedure of the acquiring unit 12, the processing unit 13, the accumulating unit 14, and the like is realized by software, and the software is stored in a storage medium such as a ROM. The processing procedure may be realized also by hardware (a dedicated circuit).

In the description above, the storage unit 11 includes the product information storage unit 111 and the image storage unit 112, the acquiring unit 12 includes the personal attribute value acquiring unit 121, the location type identifier acquiring unit 122, and the image acquiring unit 123, the processing unit 13 includes the determining unit 131 and the holding unit 132, and the accumulating unit 14 includes the personal attribute value-related information accumulating unit 141 and the location type-related information accumulating unit 142, but these inclusion relationships are merely for the sake of convenience, and may be changed as appropriate. For example, the holding unit 132 included in the processing unit 13 may be included in the storage unit 11, or the personal attribute value-related information accumulating unit 141 and the location type-related information accumulating unit 142 included in the accumulating unit 14 may be moved to be included in the processing unit 13 and the accumulating unit 14 may be omitted.

Figure 3:
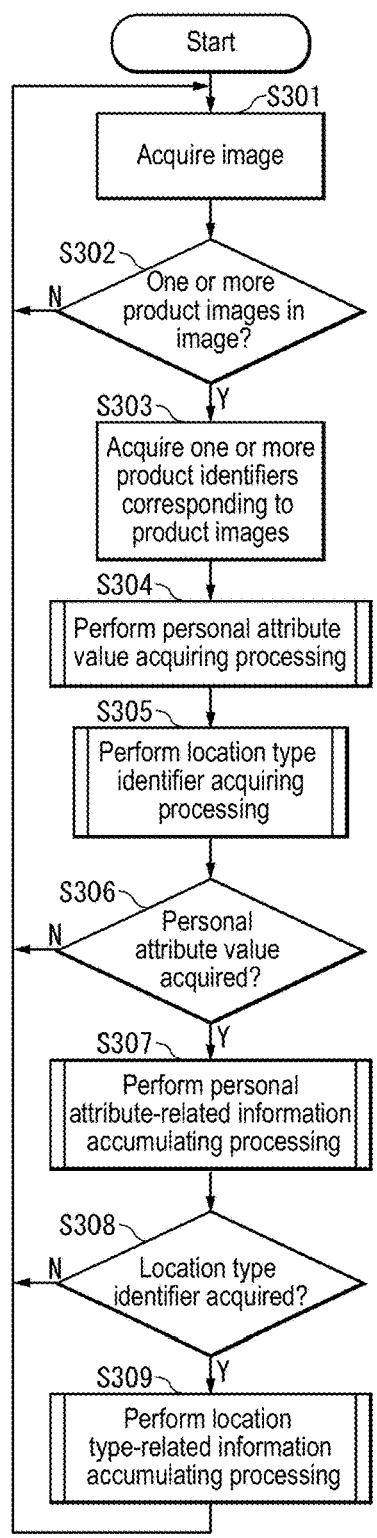
FIG. 3 is a flowchart illustrating an operation of the image analysis apparatus 1 in this example.

Next, an operation of the image analysis apparatus 1 will be described with reference to the flowchart in FIGS. 3 to 7. FIG. 3 is a flowchart illustrating the entire operation of the image analysis apparatus 1.

It is assumed that, in the product information storage unit 111, one or at least two pieces of product information each having a product identifier for identifying a product and product specifying image information, which is information on an image that specifies the product, are stored, and the holding unit 132 holds a first correspondence table, which is a correspondence table between a personal attribute value and one or more features, a second correspondence table, which is a correspondence table between an object identifier and one or more features, a third correspondence table, which is a correspondence table between a location type identifier and one or more object identifiers, a fourth correspondence table, which is a correspondence table between an event type identifier, and one or more product identifiers, one or more personal attribute values, a location type identifier, one or more object identifiers, and the like. Note that one or more images may be stored in the image storage unit 112. The stored images may be images acquired from an external apparatus such as the server apparatuses 2, or may be images held by the image analysis apparatus 1 in advance.

(Step S301) The image acquiring unit 123 acquires one image attached to CGM data from an external apparatus, for example, from the one or at least two server apparatuses 2 in which CGM data on the Web is stored, such as servers of Twitter® or servers of Facebook®. More specifically, for example, a CGM web page may be received, and one image may be acquired from the web page. The image that is acquired may be a still image, or may be a moving image. The acquired image is typically an image that is to be analyzed. Note that the image that is to be analyzed may be one image stored in the image storage unit 112.

(Step S302) The determining unit 131 determines, on the image that is to be analyzed, whether or not there are images of one or more products corresponding to the product specifying image information, in the image, using the stored product specifying image information. If there are images of one or more products corresponding to the product specifying image information, in the image, the procedure advances to step S303, and, if not, the procedure returns to step S301.

Whether or not there are images of one or more products (product images) corresponding to the product specifying image information, in the image, can be determined, for example, as follows.

First, the image is divided into multiple objects (regions). Next, one object is selected from among the multiple objects, and the degree of similarity between the object and the product specifying image information is calculated. Then, whether or not the object is similar to the product specifying image information is judged based on a comparison between the degree of similarity and a threshold. If the object is similar to the product specifying image information, it is determined at that point in time that there are one or more product images corresponding to the product specifying image information, in the image, whereas, if the object is not similar to the product specifying image information, another object is selected from among the multiple objects, and the above-described processing is repeated.

The above-described processing is repeated until a judgment result regarding whether or not an object is similar to the product specifying image information becomes YES or there is no more object that is to be selected from among the multiple objects (there is no more unselected object). If there is no more unselected object in a state where a judgment result regarding whether or not an object is similar to the product specifying image information has not become YES, it is determined that there are not images of one or more products corresponding to the product specifying image information, in the image. Thus, step S302 is completed.

If two or more pieces of product information are stored in the product information storage unit 111, the determining unit 131 may determine, on one image that is to be analyzed, whether or not there are images of two or more products corresponding to the two or more pieces of product specifying image information, in that one image, using the two or more pieces of product specifying image information in the product information storage unit 111. If there are images of two or more products corresponding to two or more pieces of product specifying image information, in that one image, the procedure advances to step S303, and, if not, the procedure returns to step S301.

Whether or not there are images of two or more products (product images) corresponding to the product specifying image information, in that one image, can be determined, for example, as follows. First, the image is divided into multiple objects (regions). Next, one object is selected from among the multiple objects, and one piece of product specifying image information is selected from among the two or more pieces of product specifying image information. The degree of similarity between the object and the product specifying image information is calculated. Then, whether or not the object is similar to the product specifying image information is judged based on a comparison between the degree of similarity and a threshold. If the objects are not similar to the product specifying image information, it is determined at that point in time that there are not two or more product images corresponding to the two or more pieces of product specifying image information, in that one image, whereas, if there is an object similar to the product specifying image information, the above-described processing is repeated while changing a combination between an object and product specifying image information.

The above-described processing is repeated until a judgment result regarding whether or not an object is similar to the product specifying image information becomes YES twice or more or there is no more unselected combination. Then, if there is no more unselected combination a state where a judgment result regarding whether or not an object is similar to the product specifying image information has not becomes YES twice or more, it is determined that there are not images of products corresponding to the two or more pieces of product specifying image information, in that one image. Thus, step S302 is completed.

(Step S303) The acquiring unit 12 acquires, from the product information storage unit 111, a product identifier paired with the product specifying image information from which the determining unit 131 has determined that there is an image of a product corresponding to the product specifying image information. The acquired one or more product identifiers are temporarily held by the holding unit 132.

(Step S304) The personal attribute value acquiring unit 121 performs processing (personal attribute value acquiring processing) that acquires one or more personal attribute values, each of which is an attribute value of a person, in an image determined by the determining unit 131 that there is an image of a product corresponding to the product specifying image information.

If two or more pieces of product information are stored in the product information storage unit 111, the personal attribute value acquiring processing may be processing that acquires one or more personal attribute values, in an image determined by the determining unit 131 that there are images of two or more products.

Figure 4:
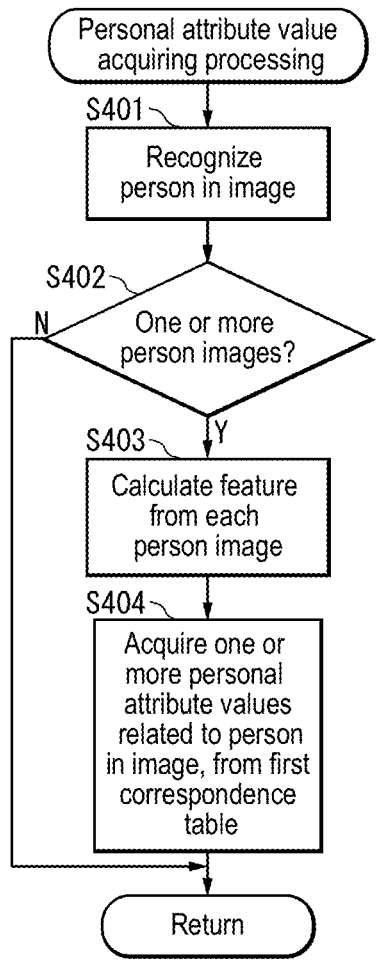
FIG. 4 is a flowchart illustrating, in detail, personal attribute value acquiring processing in this example.

FIG. 4 is a flowchart illustrating, in detail, the personal attribute value acquiring processing.

(Step S401) The personal attribute value acquiring unit 121 first recognizes a person in the image. The recognition of a person may be performed through face recognition. The recognition of a person or a face can be performed, for example, following a known algorithm using the degree of similarity.

(Step S402) The personal attribute value acquiring unit 121 determines whether or not there are one or more person images, each of which is an image of a person, in the image. If it is determined from the recognition result that there are one or more person images, in the image, the procedure advances to step S403, and, if not, the procedure returns to the flowchart in FIG. 3.

(Step S403) The personal attribute value acquiring unit 121 calculates a feature from each person image. The calculation of a feature from each person image can also be performed following a known algorithm.

(Step S404) The personal attribute value acquiring unit 121 acquires a personal attribute value, for example, such as sex or age. The personal attribute value may also be information of being a person. For example, a correspondence table (first correspondence table) between a personal attribute value and one or more features is held by the holding unit 132, and one or more personal attribute values, each of which is an attribute value of a person in an image, is acquired from this first correspondence table, using the feature acquired in step S403. The acquired one or more personal attribute values are temporarily held by the holding unit 132.

Subsequently, the procedure returns to the flowchart in FIG. 3.

(Step S305) The location type identifier acquiring unit 122 performs processing (location type identifier acquiring processing) that acquires a location type identifier for identifying the type of location, in an image determined by the determining unit 131 that there is an image of a product corresponding to the product specifying image information.

Figure 5:
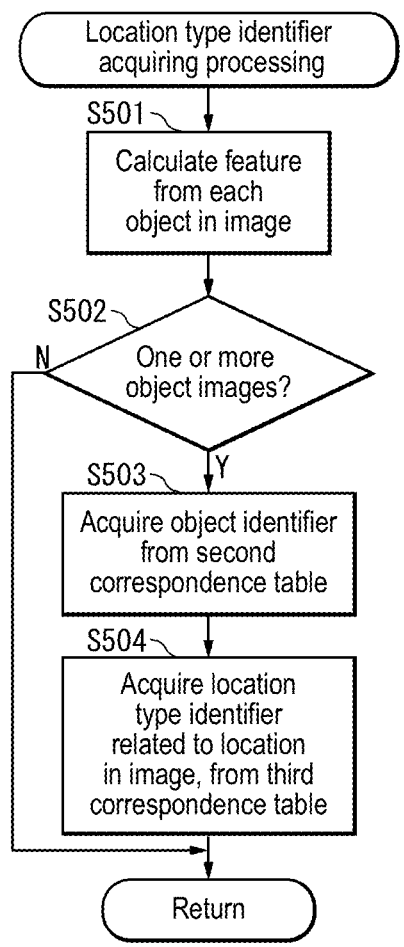
FIG. 5 is a flowchart illustrating, in detail, location type identifier acquiring processing in this example.

FIG. 5 is a flowchart illustrating, in detail, the location type identifier acquiring processing.

(Step S501) The location type identifier acquiring unit 122 first calculates a feature from each object in the image. The extraction of a feature can be performed following a known algorithm.

(Step S502) The location type identifier acquiring unit 122 compares the extracted feature with the features registered in the second correspondence table, thereby determining whether or not there are one or more object images, each of which is an image of an object, in the image. The determination regarding whether or not there are one or more object images in the image can be performed through processing similar to the determination regarding whether or not there are one or more product images in the image (see step S302). If it is determined from the comparison result that there are one or more object images in the image, the procedure advances to step S503, and, if not, the procedure returns to the flowchart in FIG. 3.

(Step S503) The location type identifier acquiring unit 122 acquires one or more object identifiers corresponding to the one or more object images, from the second correspondence table. The acquired one or more object identifiers are temporarily held by the holding unit 132.

(Step S504) The location type identifier acquiring unit 122 compares the one or more object identifiers temporarily held by the holding unit 132 with the object identifiers registered in the third correspondence table, thereby acquiring a location type identifier related to a location in the image. Specifically, for example, a location type identifier corresponding to an object identifier having the highest degree of similarity with the temporarily held one or more object identifiers, among the one or more object identifiers registered in the third correspondence table, is acquired. The acquired location type identifier is temporarily held by the holding unit 132.

Subsequently, the procedure returns to the flowchart in FIG. 3.

(Step S306) The personal attribute value-related information accumulating unit 141 determines whether or not the personal attribute value acquiring unit 121 has acquired one or more personal attribute values. If one or more personal attribute values are temporarily held by the holding unit 132, the procedure advances to step S306, and, if not, the procedure returns to step S301.

(Step S307) The personal attribute value-related information accumulating unit 141 performs processing (personal attribute value-related information accumulating processing) that accumulates personal attribute value-related information, which is information related to the one or more personal attribute values acquired by the personal attribute value acquiring unit 121, in association with a product identifier paired with the product specifying image information from which the determining unit 131 has determined that there is an image of a product corresponding to the product specifying image information.

If two or more pieces of product information are stored in the product information storage unit 111, the personal attribute value-related information accumulating processing may be processing that accumulates personal attribute value-related information, which is information related to the one or more personal attribute values acquired by the personal attribute value acquiring unit 121, in association with two or more product identifiers paired with the two or more pieces of product specifying image information from which the determining unit 131 has determined that there are images of two or more products.

Figure 6:
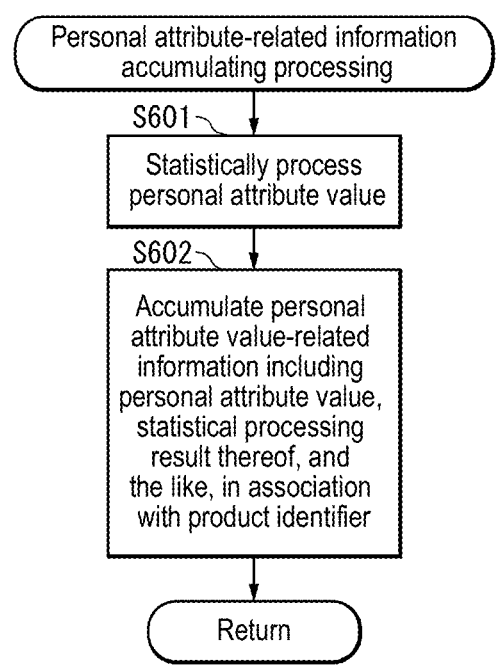
FIG. 6 is a flowchart illustrating, in detail, personal attribute value-related information accumulating processing in this example.

FIG. 6 is a flowchart illustrating, in detail, the personal attribute value-related information accumulating processing.

(Step S601) The personal attribute value-related information accumulating unit 141 statistically processes the one or more personal attribute values. The statistical processing is, for example, processing that obtains the number of women, the number of people in their 20s, or the like. Also, the male-female ratio, the distribution of the numbers of people in respective age groups, or the like may be obtained, and there is no limitation on the content of the statistical processing. The statistical processing results are temporarily held by the holding unit 132.

(Step S602) The personal attribute value-related information accumulating unit 141 accumulates personal attribute value-related information including one or more personal attribute values, the statistical processing results, and the like temporarily held by the holding unit 132, in association with each of the one or more product identifiers temporarily held by the same. The storage in which the information is accumulated is typically an internal memory, a hard disk, or the like, but the information may be transmitted to an external apparatus (the server apparatuses 2, etc.) and there is no limitation on the storage in which the information is accumulated.

Subsequently, the procedure returns to the flowchart in FIG. 3.

(Step S308) The location type-related information accumulating unit 142 determines whether or not the location type identifier acquiring unit 122 has acquired one or more location type identifiers. If one or more location type identifiers are temporarily held by the holding unit 132, the procedure advances to step S309, and, if not, the procedure returns to step S301.

(Step S309) The location type-related information accumulating unit 142 performs processing (location type-related information accumulating processing) that accumulates location type-related information, which is information related to the location type identifier acquired by the location type identifier acquiring unit 122, in association with a product identifier paired with the product specifying image information from which the determining unit 131 has determined that there is an image of a product corresponding to the product specifying image information.

Figure 7:
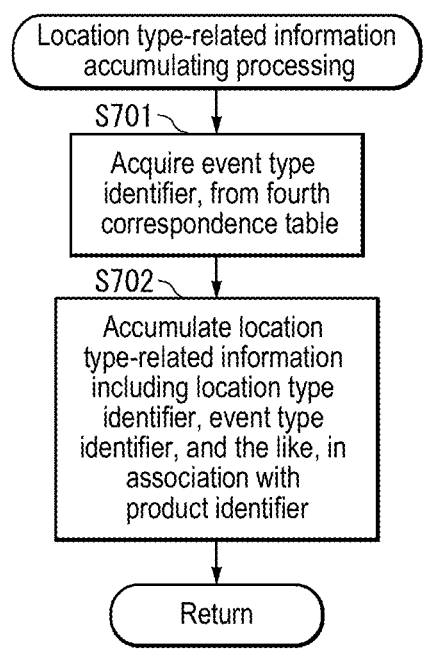
FIG. 7 is a flowchart illustrating, in detail, location type-related information accumulating processing in this example.

FIG. 7 is a flowchart illustrating, in detail, the location type-related information accumulating processing.

(Step S701) The location type-related information accumulating unit 142 acquires an event type identifier, from the fourth correspondence table, for example, using the one or more personal attribute values, the location type identifier, the one or more object identifiers, and the like temporarily held by the holding unit 132. Specifically, for example, an event type identifier corresponding to those having the highest degree of similarity with the temporarily held one or more product identifiers, one or more personal attribute values, a location type identifier, one or more object identifiers, and the like, among the one or more event type identifiers registered in the fourth correspondence table, is acquired. The acquired event type identifier is temporarily held by the holding unit 132. Note that processing is also possible that compares the acquired event identifier with a threshold, and takes an event identifier that does not reach the threshold, as an event identifier that is not to be temporarily held (as an event identifier whose type of event cannot be specified).

(Step S702) The location type-related information accumulating unit 142 accumulates location type-related information including the location type identifier, the event type identifier, and the like temporarily held by the holding unit 132, in association with each of the one or more product identifiers temporarily held by the same. The storage in which the information is accumulated is typically an internal memory, a hard disk, or the like, but the information may be transmitted to an external apparatus (the server apparatuses 2, etc.) and there is no limitation on the storage in which the information is accumulated.

Subsequently, the procedure returns to the flowchart in FIG. 3. In the next step S301, an image different from that acquired in the previous time is acquired, and the above-described processing is performed on that image.

Note that the procedure is terminated by powering off or an interruption at the end of the process in the flowcharts in FIGS. 3 to 7.

Hereinafter, a specific operation of the image analysis apparatus 1 in this example will be described. The image analysis apparatus 1 is included, for example, in an image analysis system. A conceptual diagram of the image analysis system is FIG. 1.

As described above, this image analysis system is configured by the one or at least two server apparatuses 2 and the one or at least two terminal apparatuses 3 that can be connected via the Internet to the server apparatuses 2. In the server apparatuses 2, for example, CGM data to which one or at least two images are attached is stored. The image analysis apparatus 1 is connected via the Internet to the server apparatuses 2, and acquires one or at least two images attached to the CGM data, from the server apparatuses 2.

More specifically, the server apparatuses 2 are, for example, servers of Twitter (registered trademark), servers of Facebook(registered trademark), servers of blogs, servers of YouTube(registered trademark), servers of Niconico(registered trademark), or the like. Note that there is no limitation on the type of SNS to which the server apparatuses 2 belong. The terminal apparatuses 3 are, for example, smartphones, tablets, PCs, or the like. There is no limitation on the type of the terminal apparatuses 3.

The image analysis apparatus 1 analyzes the one or at least two images acquired in this manner from the server apparatuses 2, acquires a product identifier of a product in the images and one or more personal attribute values of a person in the images, and accumulates one or more pieces of personal attribute value-related information in association with the product identifier. The image analysis apparatus 1 may acquire a location type identifier as well from an object in the images, and further accumulate the one or more pieces of location type-related information in association with the product identifier. Furthermore, the image analysis apparatus 1 can acquire and accumulate correspondence information between two or more products and personal attribute values or the like, including product identifiers and one or more attribute values of a person, from one image.

Note that one or at least two images that are to be analyzed may be acquired from an external apparatus other than the server apparatuses 2, or may be acquired from an internal memory or a hard disk.

The acquired images are typically still images, but may be moving images, and, in this case, still images constituting the moving images are to be analyzed. In either case, the images that are to be analyzed are still images, and such still image are simply referred to as image if there is no particular need to distinguish between these images.

The personal attribute value-related information or the location type-related information accumulated by the image analysis apparatus 1 may be output, for example, via the Internet to the terminal apparatuses 3.

It is assumed that, in the product information storage unit 111, two or more pieces of product information each having a product identifier and product specifying image information are stored.

Furthermore, the holding unit 132 holds a first correspondence table, which is a correspondence table between a personal attribute value and one or more features, a second correspondence table, which is a correspondence table between an object identifier and one or more features, a third correspondence table, which is a correspondence table between a location type identifier and one or more object identifiers, and a fourth correspondence table, which is a correspondence table between an event type identifier, and one or more product identifiers, one or more personal attribute values, a location type identifier, one or more object identifiers, and the like. In the image storage unit 112, one or more images may be stored.

Figure 8A:
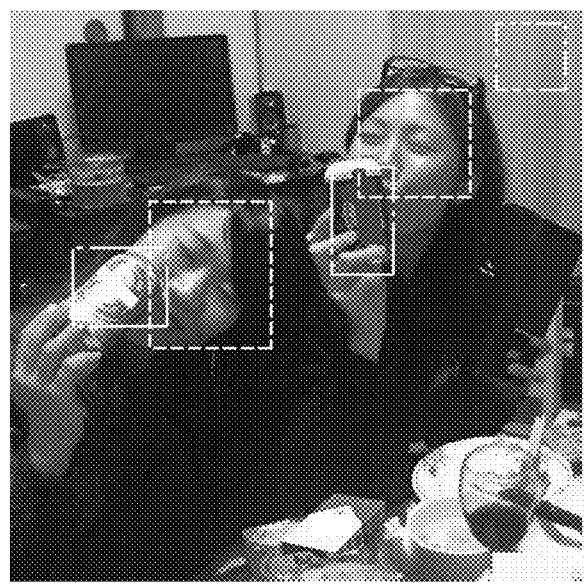
FIGS. 8A and 8B are diagrams showing an example of images that are to be analyzed in this example.
Figure 8B:
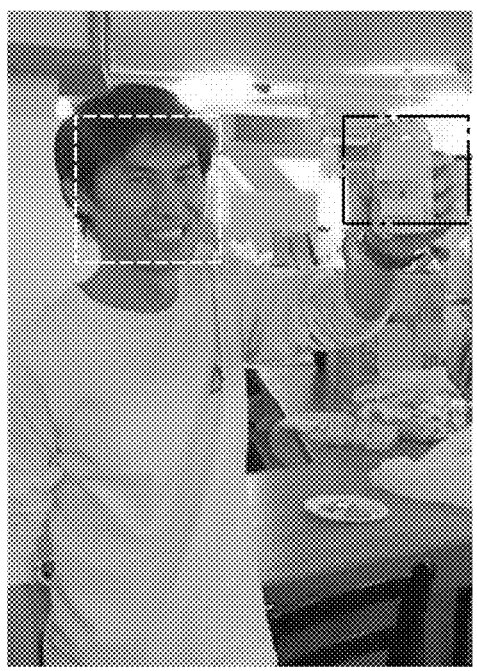

FIGS. 8A and 8B are diagrams showing an example of images that are to be analyzed. The image in FIG. 8A includes images of two women in their 20s having different brands of beer in their hands (two person images: see dotted frames), images of two logo marks respectively corresponding to the different brands (two product identifying images: see dashed dotted frames), an image of other objects such as a curtain (one object image: see a dashed double dotted frame), and the like.

The image in FIG. 8B includes an image of one man in his 30s having a certain brand of beer in his hand (one person image: see a dotted frame), an image of a logo mark corresponding to that brand (one product identifying image: see a dashed dotted frame), an image of other objects such as a bar counter (one object image: see a dashed double dotted frame), and the like.

FIG. 9 is a table showing an example of the product information stored in the product information storage unit 111. In the product information storage unit 111, a product identifier and product specifying image information are stored as a pair for each of two or more products. A group of such pairs of a product identifier and product specifying image information may be referred to as product information, but, in this example, each pair of a product identifier and product specifying image information is typically referred to as product information. The product information may further have information such as a manufacturer name, a distributor name, or the like, and a single piece of product information may be stored in the product information storage unit 111, as described above.

The product identifier is, for example, a brand name such as "Heineke*" or "Coron*", and the product specifying image information is, for example, features regarding a logo mark. A logo mark is typically configured by a combination of one or more patterns or one or more text characters, and the features corresponding to "Heineke*" include, for example, a pattern color-related feature 1a, a pattern shape-related feature 1b, and the like. The features of a logo mark corresponding to "Coron*" include, for example, a pattern shape-related feature 2a, a text character style-related feature 2b, and the like.

FIG. 10 is a table showing an example of a correspondence table (first correspondence table) between a personal attribute value and one or more features. In the first correspondence table, a personal attribute value and one or more features are registered as a pair.

The personal attribute value is, for example, an attribute value related to sex such as "man" or "woman", age group such as "20s" or "30s", race such as "Asian" or "European", and the like. Note that the personal attribute value is not limited to this, and may further include attribute values related to color of clothing such as "black" or "white", type of clothing such as "T-shirt" or "dress", and the like, and there is no limitation on the type of attribute value.

Meanwhile, the one or more features are features regarding, for example, hair, skin, clothing, or the like of a person. More specifically, the features corresponding to "man" include, for example, a hair style-related feature 3a, a beard-related feature 3b, and the like. The features corresponding to "woman" include, for example, a hair length-related feature 4a, a lip color-related feature 4b, and the like. The features corresponding to age group may include, for example, a feature regarding wrinkles on the skin, and the features corresponding to race may include, for example, a feature regarding color of the skin. Note that these are merely an example, and various features may be registered.

FIG. 11 is a table showing a correspondence table (second correspondence table) between an object identifier and one or more features. In the second correspondence table, an object identifier and one or more features are registered as a pair. The object identifier is an identifier related to an object other than people, in particular, an object useful for identifying a location (e.g., curtain, bar counter, scoreboard, etc.). Note that these are merely an example, and various identifiers may be registered.

Meanwhile, the one or more features are features regarding an object. More specifically, for example, the features corresponding to "curtain" include, for example, a drape-related feature 5a, a pattern-related feature 5b, and the like. The features corresponding to "bar counter" include, for example, a shape-related feature 6a, a pattern-related feature 6b, and the like. Note that these are merely an example, and various features may be registered.

FIG. 12 is a table showing a correspondence table (third correspondence table) between a location type identifier and one or more object identifiers. In the third correspondence table, a location type identifier and one or more object identifiers are registered as a pair.

The location type identifier is, for example, an identifier related to the type of location such as "home", "pub", or "baseball stadium". Note that the location type identifier may be an identifier for identifying only whether the location is "indoor" or "outdoor". The object identifier is the same as that registered in the second correspondence table.

FIG. 13 is a table showing a correspondence table (fourth correspondence table) between an event type identifier, and one or more product identifiers, one or more personal attribute values, a location type identifier, one or more object identifiers, and the like. In the fourth correspondence table, an event type identifier, and one or more product identifiers, one or more personal attribute values, a location type identifier, one or more object identifiers, and the like are registered as a pair. Those registered as a pair with an event type identifier may be all of one or more product identifiers, one or more personal attribute values, a location type identifier, and one or more object identifiers, may be any one of them, or may be any combination of two or more selected therefrom.

The event type identifier is, for example, an identifier related to the type of event such as "birthday party", "girls' night out", or "concert". Note that these are merely an example, and various event identifiers may be registered.

The personal attribute values, the location type identifier, and the object identifiers are the same as those registered in the first correspondence table, the second correspondence table, and the third correspondence table.

When the image analysis apparatus 1 is started, first, the image acquiring unit 123 acquires one or at least two images (e.g., two images as shown in FIGS. 8A and 8B) from an external apparatus such as the server apparatuses 2.

The determining unit 131 determines, on the one or at least two images that are to be analyzed, whether or not there is an image of a product corresponding to the product specifying image information, in any of the one or more images, using the stored product specifying image information. If there is an image of a product corresponding to the product specifying image information, in any of the one or more images, the acquiring unit 12 acquires, from the product information storage unit 111, a product identifier paired with the product specifying image information from which the determining unit 131 has determined that there is an image of a product corresponding to the product specifying image information.

For example, in the case of the image in FIG. 8A, there are two product images respectively corresponding to "Heineke*" and "Coron*", and two product identifiers corresponding to "Heineke*" and "Coron*" are acquired. In the case of the image in FIG. 8B, there is a product image corresponding to "*ban Shibori", and a product identifier corresponding to "*ban Shibori" is acquired. The acquired product identifiers are temporarily held by the holding unit 132.

Next, the personal attribute value acquiring unit 121 acquires one or more personal attribute values, each of which is an attribute value of a person, in an image determined by the determining unit 131 that there is an image of a product corresponding to the product specifying image information, for example, as follows.

That is to say, the personal attribute value acquiring unit 121 first recognizes a person in the image. The recognition of a person may be performed through face recognition. The recognition of a person or a face can be performed, for example, following a known algorithm using the degree of similarity. Next, it is determined whether or not there are one or more person images, each of which is an image of a person, in the image. If it is determined from the recognition result that there are one or more person images, a feature is calculated from each person image. The calculation of a feature from each person image can also be performed following a known algorithm. Next, a personal attribute value, for example, such as sex or age is acquired from the first correspondence table in FIG. 10, using the acquired feature.

For example, in the case of the image in FIG. 8A there are two person images, and personal attribute values such as "woman", "20s", and "Asian" corresponding to each person image are acquired using features of the person images. In the case of the image in FIG. 8B, there is one person image, and personal attribute values such as "man", "30s", and "Asian" corresponding to this person image are acquired. The personal attribute values are temporarily held by the holding unit 132.

Next, the location type identifier acquiring unit 122 acquires a location type identifier for identifying the type of location, in an image determined by the determining unit 131 that there is an image of a product corresponding to the product specifying image information, for example, as follows.

That is to say, the location type identifier acquiring unit 122 first calculates a feature from each object in the image. The extraction of a feature is performed, for example, following a known algorithm. Next, the extracted feature is compared with the features registered in the second correspondence table, so that it is determined whether or not there are one or more object images, each of which is an image of an object, in the image. If it is determined from the comparison result that there are one or more object images in the image, one or more object identifiers corresponding to the one or more object images are acquired from the second correspondence table. The acquired one or more object identifiers are temporarily held by the holding unit 132.

Next, the location type identifier acquiring unit 122 compares the one or more object identifiers temporarily held by the holding unit 132 with the object identifiers registered in the third correspondence table, thereby acquiring a location type identifier related to a location in the image. For example, a location type identifier corresponding to an object identifier having the highest degree of similarity with the temporarily held one or more object identifiers, among the one or more object identifiers registered in the third correspondence table, is acquired. The acquired location type identifier is temporarily held by the holding unit 132.

For example, in the case of the image in FIG. 8A in which there is an object image of a curtain, features extracted from object images including this object image of a curtain are sequentially compared with the features registered in the second correspondence table, and an object identifier corresponding to the features having the highest degree of similarity is selected, so that an object identifier related to a curtain is acquired from the second correspondence table. In the case of the image in FIG. 8B in which there is an object image of a bar counter, features extracted from object images including this object image of a bar counter are sequentially compared with the features registered in the second correspondence table, and an object identifier corresponding to the features having the highest degree of similarity is selected, so that a location type identifier related to a bar counter is acquired from the second correspondence table. The acquired location type identifier is temporarily held by the holding unit 132.

Next, the personal attribute value-related information accumulating unit 141 determines whether or not the personal attribute value acquiring unit 121 has acquired one or more personal attribute values. This determination is necessary because, if there is no person image in the image, the personal attribute value acquiring unit 121 cannot acquire any personal attribute value. If one or more personal attribute values are temporarily held by the holding unit 132, the personal attribute value-related information accumulating unit 141 determines that the personal attribute value acquiring unit 121 has acquired one or more personal attribute values, and accumulates personal attribute value-related information, which is information related to the one or more personal attribute values acquired by the personal attribute value acquiring unit 121, in association with a product identifier paired with the product specifying image information from which the determining unit 131 has determined that there is an image of a product corresponding to the product specifying image information.

Specifically, the personal attribute value-related information accumulating unit 141 first statistically processes the one or more personal attribute values. For example, the number of women, the number of people in their 20s, and the like are obtained.

For example, in the case of the image in FIG. 8A, "two people" as the number of women, "two people" as the number of people in their 20s, and the like are obtained as calculation results. In the case of the image in FIG. 8B, "one person" as the number of men, "one person" as the number of people in their 30s, and the like are obtained as calculation results. The statistical processing results are temporarily held by the holding unit 132.

Next, the personal attribute value-related information accumulating unit 141 accumulates personal attribute-related information including the one or more personal attribute values, the statistical processing results, and the like temporarily held by the holding unit 132, in association with each of the one or more product identifiers temporarily held by the same, for example, in an accumulating part such as an internal memory or a hard disk or an external apparatus (the server apparatuses 2, etc.).

FIGS. 14A and 14B are tables showing an example of the personal attribute-related information. For example, in the case of the image in FIG. 8A, personal attribute-related information such as "woman, 20s, two people, Asian, . . . " is accumulated in association with "Heineke*", and personal attribute-related information such as "woman, 20s, two people, Asian, . . . " is accumulated in association with "Coron*", as shown in FIG. 14A. In the case of the image in FIG. 8B, personal attribute-related information such as "man, 20s, one person, Asian, . . . " may be accumulated in association with "*ban Shibori".

Since the thus accumulated personal attribute-related information indicates a relationship between products and personal attributes, it can be used for, for example, analysis of consumer behavior, market research, measurement of the effects of campaigns or product launch (one approach for selling more products), demographics (demographic attribute) research, and the like. Note that these are merely an example, and there is no limitation on the method for using the accumulated personal attribute-related information.

In this example, two or more pieces of product information are stored in the product information storage unit 111, and thus the personal attribute value-related information accumulating unit 141 may accumulate personal attribute value-related information, which is information related to the one or more personal attribute values acquired by the personal attribute value acquiring unit 121, in association with two or more product identifiers paired with the two or more pieces of product specifying image information from which the determining unit 131 has determined that there are images of two or more products.

Thus, in the case of the image in FIG. 8A, personal attribute-related information such as "woman, 20s, two people, Asian, . . . " may be accumulated in association with "Heineke*, Coron*" as shown in FIG. 14B. The personal attribute value-related information in this case indicates not only a relationship between products and personal attributes but also a relationship between products, and thus it can be used also for, for example, competitive research and the like in addition to the above-described application.

Next, the location type-related information accumulating unit 142 determines whether or not the location type identifier acquiring unit 122 has acquired a location type identifier. This determination is necessary because, if there is no object image in the image, the location type identifier acquiring unit 122 cannot acquire any location type identifier. If a location type identifier is temporarily held by the holding unit 132, the location type-related information accumulating unit 142 determines that the location type identifier acquiring unit 122 has acquired a location type identifier, and accumulates location type-related information, which is information related to the location type identifier acquired by the location type identifier acquiring unit 122, in association with a product identifier paired with the product specifying image information from which the determining unit 131 has determined that there is an image of a product corresponding to the product specifying image information.

Specifically, the location type-related information accumulating unit 142 acquires an event type identifier, from the fourth correspondence table shown in FIG. 13, for example, using, as features, the one or more personal attribute values, the location type identifier, the or more object identifiers, the statistical processing results related to the personal attribute values, and the like temporarily held by the holding unit 132.

For example, in the case of the image in FIG. 8A, an event type identifier "girls' night out" corresponding to the identifiers "woman" and "two or more people" is acquired using "woman", "two people", and the like. In the case of the image in FIG. 8B, for example, an event type identifier "solo-event" corresponding to "man", "one person", and "bar counter". The acquired event type identifier is temporarily held by the holding unit 132.

Next, the location type-related information accumulating unit 142 accumulates location type-related information including the location type identifier, the event type identifier, and the like temporarily held by the holding unit 132, in association with each of the one or more product identifiers temporarily held by the same, for example, in an accumulating part such as an internal memory or a hard disk or an external apparatus (the server apparatuses 2, etc.).

FIGS. 15A and 15B are tables showing an example of the location type-related information. For example, in the case of the image in FIG. 8A, location type-related information such as "home, indoor, girls' night out, . . . " is accumulated in association with "Heineke*", and location type-related information such as "home, indoor, girls' night out, . . . " is accumulated in association with "Coron*", as shown in FIG. 15A. In the case of the image in FIG. 8B, location type-related information such as "pub, indoor, after-party, . . . " may be accumulated in association with "*ban Shibori".

Since the thus accumulated location type-related information indicates a relationship between products and the types of location, it can be used for more effective analysis of consumer behavior and the like when combined with the above-described personal attribute-related information.

In this example, two or more pieces of product information are stored in the product information storage unit 111, and thus the location type-related information accumulating unit 142 may accumulate location type-related information, which is information related to the one or more location type identifiers acquired by the location type identifier acquiring unit 122, in association with two or more product identifiers paired with the two or more pieces of product specifying image information from which the determining unit 131 has determined that there are images of two or more products.

Thus, in the case of the image in FIG. 8A, location type-related information such as "home, indoor, girls' night out, . . . " may be accumulated in association with "Heineke*, Coron*" as shown in FIG. 15B. The location type-related information in this case indicates not only a relationship between products and the types of location but also a relationship between products, and thus it can be used also for, for example, competitive research at each location in addition to the analysis of consumer behavior and the like.

Figure 16A:
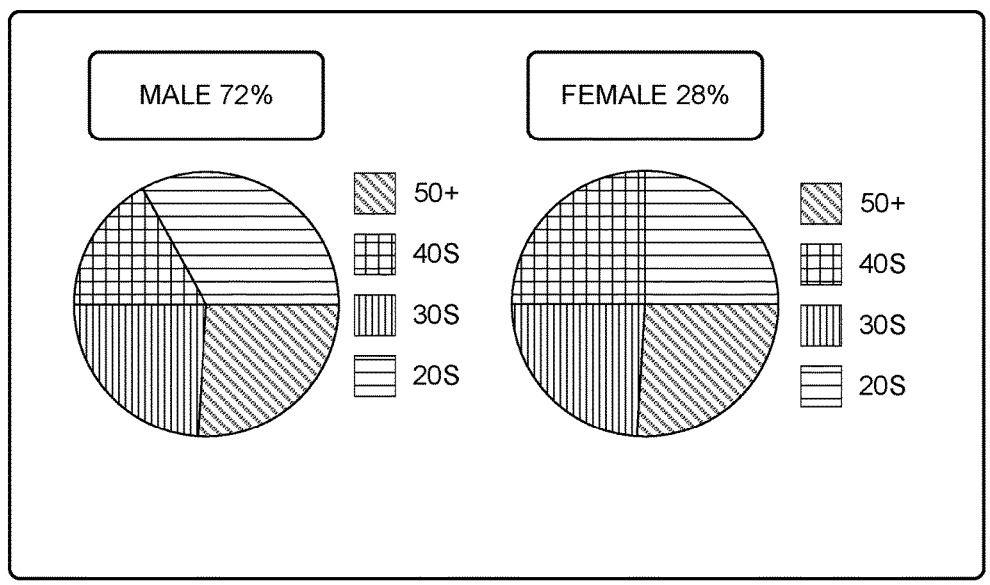
FIGS. 16A and 16B are graphs showing an example of output to a terminal apparatus in this example.
Figure 16B:
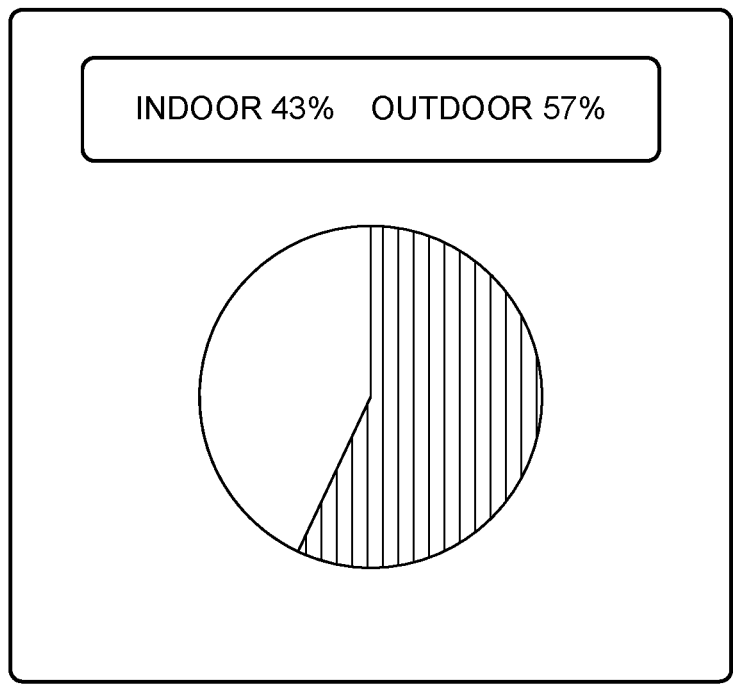

The information accumulated by the image analysis apparatus 1 is output, for example, via the Internet to the terminal apparatuses 3. FIGS. 16A and 16B are graphs showing an example of output to the terminal apparatuses 3. FIG. 16A is an example of a screen related to results obtained by statistically processing personal attribute-related information corresponding to a certain product. According to the screen in FIG. 16A, the male-female ratio of consumers who purchased the product, the number of consumers in each age group, and the like are seen. FIG. 16B is a screen related to results obtained by statistically processing location type-related information corresponding to the same product. According to the screen in FIG. 16B, the indoor-outdoor ratio of locations where the product was consumed is seen. Note that these are merely an example, and there is no limitation on the content of information that is output. The destination to which the information is output may be an external apparatus (e.g., the server apparatuses 2, etc.) other than the terminal apparatuses 3, or may be a display screen of the image analysis apparatus 1 itself, for example.

Above, according to this example, one or at least two images are analyzed, a product identifier of a product in the images and one or more personal attribute values of a person in the images are acquired, and personal attribute value-related information related to the one or more personal attribute values is accumulated in association with the product identifier, and thus it is possible to accumulate information indicating a relationship between products and at least personal attributes.

Furthermore, a location identifier for identifying the type of location in the images is further acquired, and location type-related information related to the location type identifier is further accumulated in association with the product identifier, and thus it is also possible to accumulate information indicating a relationship between products and the types of locations.

Furthermore, product identifiers of two or more products and one or more personal attribute values are acquired from one image, and personal attribute-related information is accumulated in association with the two or more product identifiers, and thus it is possible to accumulate information indicating not only a relationship between products and personal attributes but also a relationship between products.

Furthermore, it is possible to analyze one or more images attached to CGM data on the Web, and to accumulate information indicating a relationship between products and personal attributes or the like.

Furthermore, it is possible to analyze still images constituting one or more moving images attached to CGM data on the Web, and to accumulate information indicating a relationship between products and personal attributes or the like.

Furthermore, it is possible to analyze one or more images stored in the image storage unit 112, and to accumulate information indicating a relationship between products and personal attributes or the like.

The accumulated information can be used for, for example, various applications such as analysis of consumer behavior, market research, measurement of the effects of campaigns or product launch (one approach for selling more products), demographics (demographic attribute) research, competitive research, and the like.

In this example, the image analysis apparatus 1 was applied to an SNS network, but it may be applied to networks other than SNSs, may be connected peer-to-peer to another apparatus, or may be operated independently.

Furthermore, one or more images that are to be analyzed were mainly one or more images attached to CGM data on the Web (e.g., still images or moving images uploaded to SNS such as Twitter or blogs), but there is no limitation to this. For example, one or more images that are to be analyzed may be one or more images captured by surveillance cameras, and there is no limitation on the type of images.

In this example, the second correspondence table (see FIG. 11), which is a correspondence table between an object identifier and one or more features, and the third correspondence table (see FIG. 12), which is a correspondence table between a location type identifier and one or more object identifiers, were used for acquiring a location type identifier, but a fifth correspondence table (not shown), which is a correspondence table between a location type identifier and one or more features, may be used. In the fifth correspondence table, a location type identifier and one or more features are registered as a pair.

The location type identifier is, for example, an identifier related to the type of location such as "home", "pub", or "baseball stadium". The location type identifier may be an identifier for identifying only whether the location is "indoor" or "outdoor". Meanwhile, the one or more features are, for example, features regarding an object. Specifically, features regarding "curtain", features regarding home appliances, and the like are registered as a pair with "home", features regarding "bar counter", features regarding wine bottles, and the like are registered as a pair with "pub", and features regarding "scoreboard", features regarding baseball caps, and the like are registered as a pair with "baseball stadium". Note that these are merely an example, and various location type identifiers may be registered as a pair with features regarding various objects.

In this case, the location type identifier acquiring unit 122 first calculates a feature from each object in the image. The extraction of a feature can be performed following a known algorithm. Next, the extracted feature may be compared with the features registered in the fifth correspondence table, and a location type identifier corresponding to the features having the highest degree of similarity may be acquired from the fifth correspondence table.

Furthermore, in this example, the fourth correspondence table (see FIG. 13), which is a correspondence table between an event type identifier, and one or more product identifiers, one or more personal attribute values, a location type identifier, one or more object identifiers, and the like, is used for acquiring an event type identifier, but a sixth correspondence table (not shown), which is a correspondence table between an event type identifier and one or more features, may be used. In the sixth correspondence table, an event type identifier and one or more features are registered as a pair.

The event type identifier is, for example, an identifier related to the type of event such as "birthday party" or "baseball game". The features are, for example, features regarding an object. Specifically, features regarding "birthday cake", features regarding "decoration", and the like are registered as a pair with "birthday party", and features regarding "scoreboard", features regarding "baseball cap", and the like are registered as a pair with "baseball game". Note that these are merely an example, and various event type identifiers may be registered as a pair with features regarding various objects. A combination of this sort of one or more features, and one or more product identifiers, one or more personal attribute values, a location type identifier, and the like may also be registered as a pair with an event type identifier.

In this case, for example, the location type-related information accumulating unit 142 may compare features extracted from each object in the image (and temporarily held one or more product identifiers, one or more personal attribute values, a location type identifier, etc.) with the features registered in the sixth correspondence table (and one or more product identifiers, one or more personal attribute values, a location type identifier, etc.), and acquire an event type identifier corresponding to the features having the highest degree of similarity or the like from the sixth correspondence table.

The processing in this example may be realized by software. The software may be distributed by software downloads or the like. Furthermore, the software may be distributed in a form where the software is stored in a storage medium such as a CD-ROM. Note that the same is applied to other examples described in this specification. The software that realizes the information processing apparatus in this example may be the following sort of program.

Specifically, this program is a program, using a storage medium including a product information storage unit in which product information having a product identifier for identifying a product and product specifying image information, which is information on an image that specifies the product, can be stored, the program causing a computer to function as: a determining unit that determines, on one or at least two images that are to be analyzed, whether or not there is an image of a product corresponding to the product specifying image information, in any of the one or more images, using the stored product specifying image information; a personal attribute value acquiring unit that acquires one or more personal attribute values, each of which is an attribute value of a person, in an image determined by the determining unit that there is an image of a product corresponding to the product specifying image information; and a personal attribute value-related information accumulating unit that accumulates personal attribute value-related information, which is information related to the one or more personal attribute values acquired by the personal attribute value acquiring unit, in association with a product identifier paired with the product specifying image information from which the determining unit has determined that there is an image of a product corresponding to the product specifying image information.

This program causes the computer to further function as: a location type identifier acquiring unit that acquires a location type identifier for identifying the type of location, in an image determined by the determining unit that there is an image of a product corresponding to the product specifying image information; and a location type-related information accumulating unit that accumulates location type-related information, which is information related to the location type identifier, in association with a product identifier paired with the product specifying image information.

In this program, two or more pieces of product information are stored in the product information storage unit, the determining unit determines, on one image that is to be analyzed, whether or not there are images of two or more products corresponding to the two or more pieces of product specifying image information, in that one image, using the two or more pieces of product specifying image information in the product information storage unit, the personal attribute value acquiring unit acquires one or more personal attribute values, in an image determined by the determining unit that there are images of two or more products, and the personal attribute value-related information accumulating unit accumulates personal attribute value-related information, which is information related to the one or more personal attribute values acquired by the personal attribute value acquiring unit, in association with two or more product identifiers paired with the two or more pieces of product specifying image information from which the determining unit has determined that there are images of two or more products.

This program causes the computer to further function as: an image acquiring unit that acquires one or more images from one or at least two server apparatuses in which CGM data on the Web is stored, wherein the one or more images that are to be analyzed are the images acquired by the image acquiring unit.

In this program, the image acquiring unit acquires one or more moving images from one or at least two server apparatuses in which CGM data on the Web is stored, and the one or more images that are to be analyzed are still images constituting the moving images.

This program causes the computer to further function as: an image storage unit in which one or more images can be stored, wherein the one or more images that are to be analyzed are the images stored in the image storage unit.

EXAMPLE 2

The configuration of the image analysis system in Example 2 is different from that in Example 1 above (see FIG. 1), in that the image analysis apparatus 1 is replaced by an image analysis apparatus 1B. The operations of units other than the image analysis apparatus 1B are as in Example 1. Thus, FIG. 1 and a description based thereon are applied to Example 2. Note that the image analysis apparatus 1 is replaced by the image analysis apparatus 1B.

Figure 17:
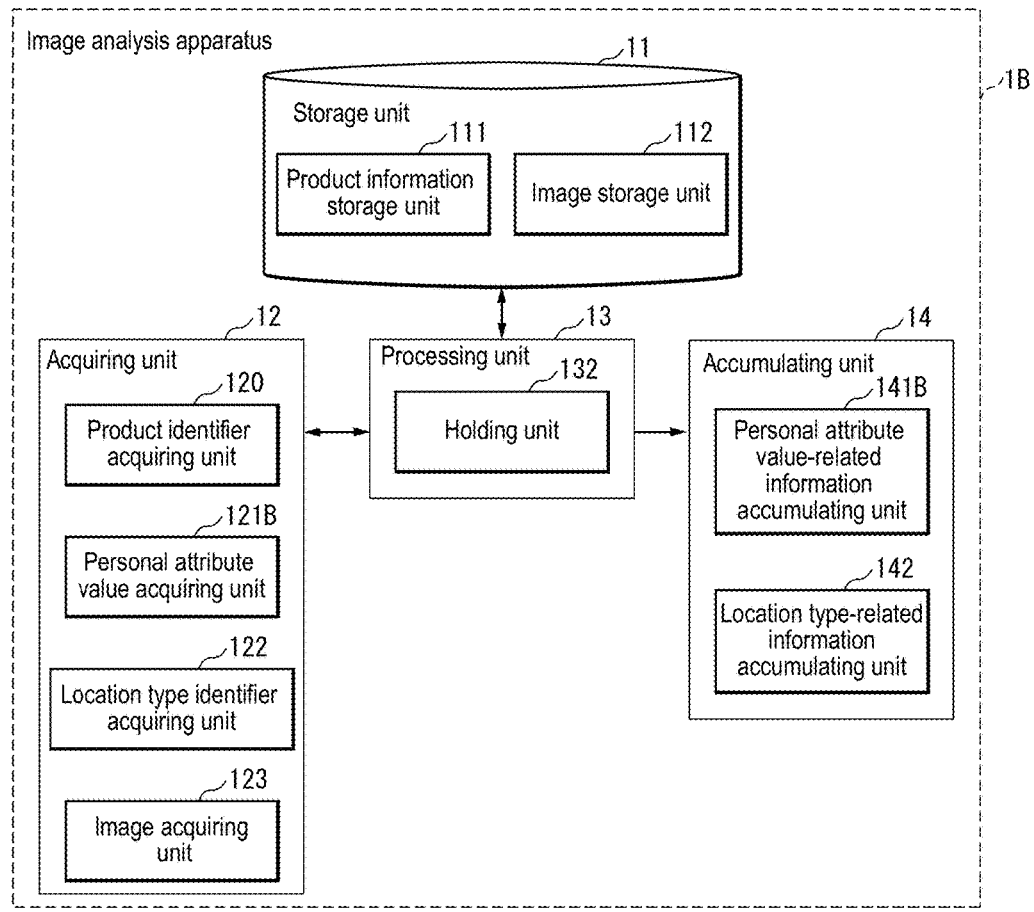
FIG. 17 is a block diagram of an image analysis apparatus 1B in Example 2.

FIG. 17 is a block diagram of the image analysis apparatus 1B in Example 2. The image analysis apparatus 1B is different from the image analysis apparatus 1 in Example 1 (see FIG. 2), in that the acquiring unit 12 further includes a product identifier acquiring unit 120, the personal attribute value acquiring unit 121 and the personal attribute value-related information accumulating unit 141 are replaced by a personal attribute value acquiring unit 121B and a personal attribute value-related information accumulating unit 141B, and the determining unit 131 is deleted from the processing unit 13. The functions of the determining unit 131 are incorporated by the product identifier acquiring unit 120. The operations of units other than the product identifier acquiring unit 120, the personal attribute value acquiring unit 121B, and the personal attribute value-related information accumulating unit 141B are as in Example 1.

That is to say, in the product information storage unit 111, product information having a product identifier for identifying a product and product specifying image information, which is information on an image that specifies the product, is stored.

The product identifier acquiring unit 120 detects, from one or at least two images that are to be analyzed, that there is an image of a product corresponding to the product specifying image information, in any of the one or more images, using the stored product specifying image information, and acquires one or more product identifiers corresponding to the images of the products.

Furthermore, the product identifier acquiring unit 120 determines, on the one or at least two images that are to be analyzed, whether or not there is an image of a product corresponding to the product specifying image information, in any of the one or more images, using the stored product specifying image information. This is the same function as that of the determining unit 131 in Example 1.

The personal attribute value acquiring unit 121B acquires one or more personal attribute values, each of which is an attribute value of a person in an image, from the one or at least two images that are to be analyzed.

It is preferable that the product identifier acquiring unit 120 determines, on the one or at least two images that are to be analyzed, whether or not there is an image of a product corresponding to the product specifying image information, in any of the one or more images, using the stored product specifying image information. The personal attribute value acquiring unit 121B acquires one or more personal attribute values, each of which is an attribute value of a person, in an image determined by the product identifier acquiring unit 120 that there is an image of a product corresponding to the product specifying image information. This is the same operation as that of the personal attribute value acquiring unit 121.

The location type identifier acquiring unit 122 acquires a location type identifier for identifying the type of location, in an image determined by the product identifier acquiring unit 120 that there is an image of a product corresponding to the product specifying image information.

The personal attribute value-related information accumulating unit 141B accumulates personal attribute value-related information, which is information related to the one or more personal attribute values acquired by the personal attribute value acquiring unit 121B, in association with a product identifier paired with the product specifying image information from which the product identifier acquiring unit 120 has determined that there is an image of a product corresponding to the product specifying image information. This is the same operation as that of the personal attribute value-related information accumulating unit 141.

The location type-related information accumulating unit 142 accumulates location type-related information, which is information related to the location type identifier, in association with a product identifier paired with the product specifying image information.

Figure 18:
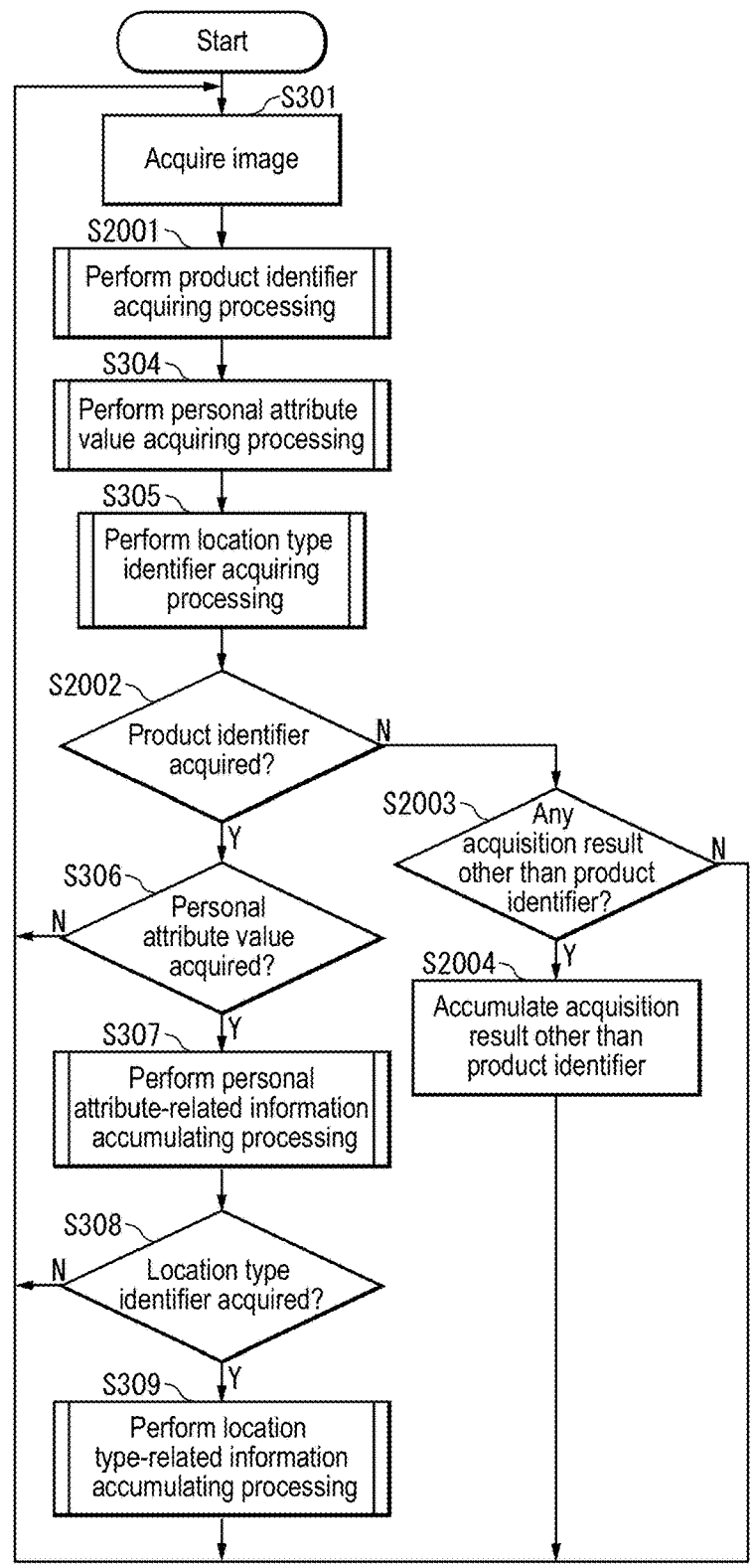
FIG. 18 is a flowchart illustrating an operation of the image analysis apparatus 1B in this example.

FIG. 18 is a flowchart illustrating an operation of the image analysis apparatus 1B. The flowchart in FIG. 18 is different from the flowchart in FIG. 3, in that steps S302 and S303 are deleted, step S2001 is interposed between steps S301 and S304, step S2002 is interposed between steps S305 and S306, and, furthermore, steps S2003 and S2004 branching from step S2002 are added.

(Step S2001) The product identifier acquiring unit 120 performs product identifier acquiring processing, which is processing that detects, from one or at least two images that are to be analyzed, that there are images of products corresponding to one or more pieces of product specifying image information, in any of the one or more images, using the stored one or more pieces of product specifying image information, and acquires one or more product identifiers corresponding to the images of the products. The acquired one or more product identifiers are temporarily held by the holding unit 132.

Figure 19:
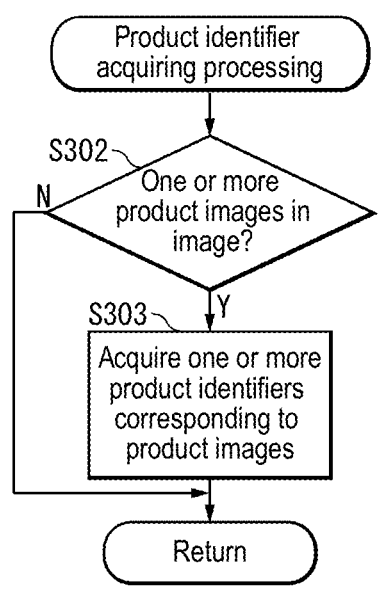
FIG. 19 is a flowchart illustrating, in detail, product identifier acquiring processing in this example.

FIG. 19 is a flowchart illustrating, in detail, the product identifier acquiring processing. The flowchart in FIG. 19 includes steps S302 and S303 that are the same as those in FIG. 3.

Note that the flowchart in FIG. 19 is different from that in FIG. 3, in that, if the result in step S302 is NO, the procedure does not return to step S301 but returns to the flowchart in FIG. 18.

(Step S2002) The accumulating unit 14 determines whether or not the product identifier acquiring unit 120 has acquired one or more product identifiers. If one or more product identifiers are temporarily held by the holding unit 132, the procedure advances to step S306, and, if not, the procedure advances to step S2003.

(Step S2003) The accumulating unit 14 judges whether or not there are acquisition results other than the product identifiers. For example, if one or more personal attribute values or one or more location type identifiers are temporarily held by the holding unit 132, the procedure advances to step S2004, and, if not, the procedure returns to step S301.

(Step S2004) The accumulating unit 14 accumulates acquisition results other than the product identifiers, such as one or more personal attribute values or one or more location type identifiers. Subsequently, the procedure returns to step S301.

In the flowchart in FIG. 18, the order in which three processes consisting of the product identifier acquiring processing (Step S2001), the personal attribute value acquiring processing (Step S304), and the location type identifier acquiring processing (Step S305) are performed is not limited to that described above, and may be changed as appropriate.

For example, after an image is acquired in step S301, it is possible to perform the personal attribute value acquiring processing first, the location type identifier acquiring processing next, and then the product identifier acquiring processing, or it is possible to perform the location type identifier acquiring processing first, the product identifier acquiring processing next, and then the personal attribute value acquiring processing. Alternatively, it is possible to acquire information in order of product, location, and then person, in order of person, product, and then location, in order of location, person, and then product. Furthermore, these three processes do not necessarily have to be sequentially performed, and may be performed in parallel.

In a similar manner, two processes consisting of the personal attribute-related information accumulating processing (Step S307) and the location type-related information accumulating processing (Step S309) may be performed in reverse order, or may be performed in parallel (the same is applied to Example 1).

If multiple processes are performed in parallel, for example, they may be performed by multiple MPUs or the like, or may be performed by one MPU in a time-division manner.

The flowcharts in FIGS. 4 to 7 and the examples in FIGS. 8 to 16, and a description based thereon are applied to Example 2.

A specific operation of the image analysis apparatus 1B is the same as that of the image analysis apparatus 1, except for the following points.

In the case of judging whether or not one or more product images are contained in an image that is to be analyzed, and determining that no product image is contained therein, the image analysis apparatus 1 does not perform, on that image, any more processing, such as the personal attribute value acquiring processing, the location type identifier acquiring processing, the personal attribute-related information accumulating processing, the location type-related information accumulating processing, or the like, whereas the image analysis apparatus 1B performs, on that image, the personal attribute value acquiring processing and the location type-related information acquiring processing, and accumulates the acquisition results, even in the case where no product image is contained in the image that is to be analyzed. Thus, it is possible to accumulate other information that can be acquired from the image, such as information indicating a relationship between personal attributes and the types of location, and the like.

That is to say, the image analysis apparatus 1B can accumulate at least two of a product identifier, personal attribute-related information, and location type-related information, in association with each other. Accordingly, it is possible to accumulate product and personal attribute-related information, which is a group of pairs of a product identifier and personal attribute-related information, for example, as shown in FIG. 14A, product and location type-related information, which is a group of pairs of a product identifier and location type-related information, for example, as shown in FIG. 15A, personal attribute and location type-related information (not shown), which is a group of pairs of personal attribute-related information and location type-related information, and product and personal attribute and location type-related information (not shown), which is a group of combinations of a product identifier, personal attribute-related information and location type-related information.

Above, according to Example 2, one or at least two images are analyzed, one or more product identifiers of products in the images and one or more personal attribute values of a person in the images are acquired, and the one or more product identifiers and the one or more personal attribute values that are identifiers and information acquired from the same image are accumulated in association with each other, and thus it is possible to accumulate at least information indicating a relationship between products and personal attributes.

Furthermore, a location identifier for identifying the type of location in the images is further acquired, and location type-related information related to the location type identifier is further accumulated in association with the product identifier, and thus it is also possible to accumulate information indicating a relationship between products and the types of locations.

Preferably, as in Example 1 above, it is determined on the one or at least two images that are to be analyzed, whether or not there is an image of a product corresponding to the product specifying image information, in any of the one or more images, using the stored product specifying image information, one or more personal attribute values, each of which is an attribute value of a person, in an image determined that there is an image of a product corresponding to the product specifying image information, are acquired, and personal attribute value-related information, which is information related to the acquired one or more personal attribute values, can be accumulated in association with a product identifier paired with the product specifying image information from which it is determined that there is an image of a product corresponding to the product specifying image information. Accordingly, it is possible to accumulate information indicating a relationship between products and at least personal attributes.

Furthermore, product identifiers of two or more products and one or more personal attribute values are acquired from one image, and personal attribute-related information is accumulated in association with the two or more product identifiers, and thus it is possible to accumulate information indicating not only a relationship between products and personal attributes but also a relationship between products.

Furthermore, it is possible to analyze one or more images attached to CGM data on the Web, and to accumulate information indicating a relationship between products and personal attributes or the like.

Furthermore, it is possible to analyze still images constituting one or more moving images attached to CGM data on the Web, and to accumulate information indicating a relationship between products and personal attributes or the like.

Furthermore, it is possible to analyze one or more images stored in the image storage unit 112, and to accumulate information indicating a relationship between products and personal attributes or the like.

However, contrary to Example 1, it is also possible to accumulate other information that can be acquired from the same image, such as information indicating a relationship between personal attributes and the types of location, and the like.

The processing in Example 2 may also be realized by software as in Example 1. The software that realizes the information processing apparatus in this example may be the following sort of program.

Specifically, this program is a program, using a computer-accessible storage medium including a product information storage unit in which one or more pieces of product information each having a product identifier for identifying a product and product specifying image information, which is information on an image that specifies the product, can be stored, the program causing a computer to function as: a product identifier acquiring unit that detects, from one or at least two images that are to be analyzed, that there are images of products corresponding to one or more pieces of product specifying image information, in any of the one or more images, using the stored one or more pieces of product specifying image information, and acquires one or more product identifiers corresponding to the images of the products; a personal attribute value acquiring unit that acquires one or more personal attribute values, each of which is an attribute value of a person in an image, from the one or at least two images that are to be analyzed; and a personal attribute value-related information accumulating unit that accumulates the one or more product identifiers acquired by the product identifier acquiring unit and personal attribute value-related information, which is information related to the one or more personal attribute values acquired by the personal attribute value acquiring unit, in association with each other, the product identifiers and the personal attribute values being information acquired from a same image.

This program causes the computer to further function as: a location type identifier acquiring unit that acquires a location type identifier for identifying the type of location in an image, from the one or at least two images that are to be analyzed; and a location type-related information accumulating unit that accumulates location type-related information, which is information related to the location type identifier, in association with a product identifier paired with the product specifying image information.

In this program, the product identifier acquiring unit determines, on the one or at least two images that are to be analyzed, whether or not there is an image of a product corresponding to the product specifying image information, in any of the one or more images, using the stored product specifying image information, and the personal attribute value acquiring unit acquires one or more personal attribute values, each of which is an attribute value of a person, in an image determined by the product identifier acquiring unit that there is an image of a product corresponding to the product specifying image information, and the personal attribute value-related information accumulating unit accumulates personal attribute value-related information, which is information related to the one or more personal attribute values acquired by the personal attribute value acquiring unit, in association with a product identifier paired with the product specifying image information from which the product identifier acquiring unit has determined that there is an image of a product corresponding to the product specifying image information.

In this program, two or more pieces of product information are stored in the product information storage unit, the product identifier acquiring unit determines, on one image that is to be analyzed, whether or not there are images of two or more products corresponding to the two or more pieces of product specifying image information, in that one image, using the two or more pieces of product specifying image information in the product information storage unit, the personal attribute value acquiring unit acquires one or more personal attribute values, in an image determined by the product identifier acquiring unit that there are images of two or more products, and the personal attribute value-related information accumulating unit accumulates personal attribute value-related information, which is information related to the one or more personal attribute values acquired by the personal attribute value acquiring unit, in association with two or more product identifiers paired with the two or more pieces of product specifying image information from which the product identifier acquiring unit has determined that there are images of two or more products.

This program causes the computer to further function as: an image acquiring unit that acquires one or more images from one or at least two server apparatuses in which CGM data on the Web is stored, wherein the one or more images that are to be analyzed are the images acquired by the image acquiring unit.

In this program, the image acquiring unit acquires one or more moving images from one or at least two server apparatuses in which CGM data on the Web is stored, and the one or more images that are to be analyzed are still images constituting the moving images.

This program causes the computer to further function as: an image storage unit in which one or more images can be stored, wherein the one or more images that are to be analyzed are the images stored in the image storage unit.

Figure 20:
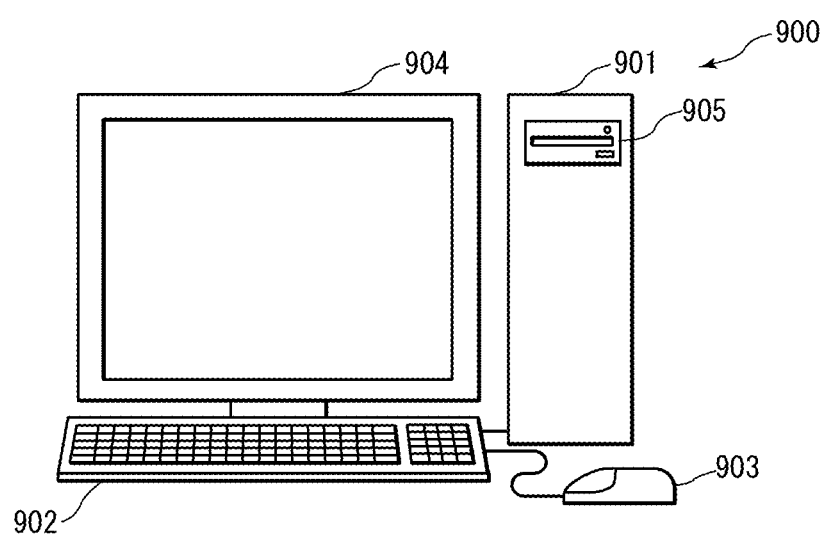
FIG. 20 is an external view of a computer system 900 in this example.

FIG. 20 is a schematic view showing an example of an external view of a computer system 900 that executes the programs described above to realize the image analysis apparatus 1 according to Example 1 or 2 above. Example 1 or 2 above may be realized using computer hardware and computer programs executed thereon.

In FIG. 20, the computer system 900 includes a computer 901 including a CD-ROM drive 905, a keyboard 902, a mouse 903, and a monitor 904.

Figure 21:
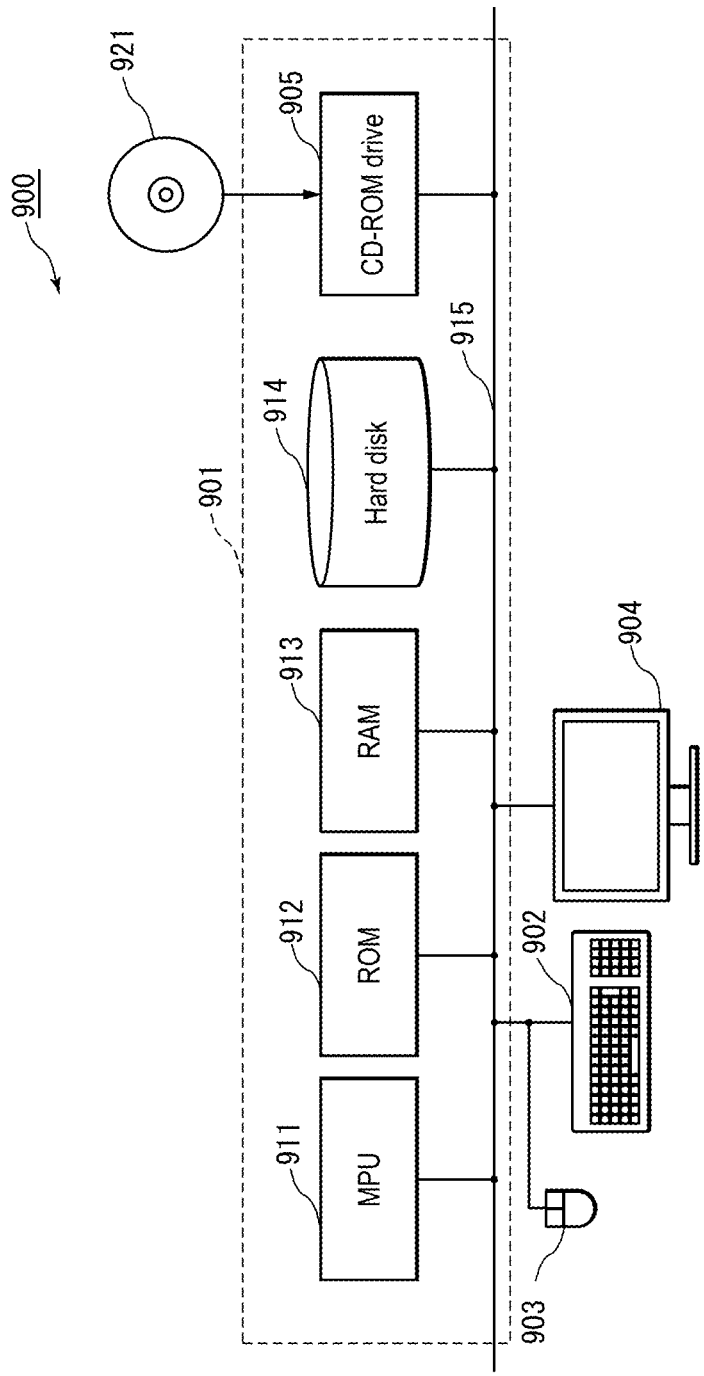
FIG. 21 is a diagram showing the internal configuration of the computer system 900 in this example.

FIG. 21 is a diagram showing an internal configuration of the computer system 900. In FIG. 21, the computer 901 includes, in addition to the CD-ROM drive 905, an MPU (micro processing unit) 911, a ROM 912 in which a program such as a boot up program is to be stored, a RAM 913 that is connected to the MPU 911 and in which a command of an application program is temporarily stored and a temporary storage area is provided, a hard disk 914 in which an application program, a system program, and data are stored, and a bus 915 that connects the MPU 911, the ROM 912, and the like. Note that the computer 901 may include an unshown network card for providing a connection to a LAN, a WAN, and the like.

The program for causing the computer system 900 to execute the functions of the image analysis apparatus 1 according to the foregoing examples may be stored in a CD-ROM 921 that is inserted into the CD-ROM drive 905 and be transferred to the hard disk 914. Alternatively, the program may be transmitted via an unshown network to the computer 901 and stored in the hard disk 914. At the time of execution, the program is loaded into the RAM 913. The program may be loaded from the CD-ROM 921, or directly from a network. The program may be read on the computer system 900 via another storage medium (e.g., a DVD, etc.) instead of the CD-ROM 921.

The program does not necessarily have to include, for example, an operating system (OS) or a third party program to cause the computer 901 to execute the functions of the image analysis apparatus 1 according to the foregoing examples. The program may only include a command portion to call an appropriate function or module in a controlled mode and obtain desired results. The manner in which the computer system 900 operates is well known, and thus a detailed description thereof has been omitted.

The computer that executes this program may be a single computer, or may be multiple computers. That is to say, the program may be executed by centralized processing or by distributed processing.

In the foregoing examples, each process (each function) may be realized as centralized processing using a single apparatus (system), or may be realized as distributed processing using multiple apparatuses.

The present invention is not limited to the example set forth herein. Various modifications are possible within the scope of the invention.

As described above, the image analysis apparatus according to the present invention analyzes images, and accumulates pairs of a product identifier and personal attribute value-related information, and thus it has an effect that information indicating a relationship between products and at least personal attributes can be accumulated. Accordingly, this apparatus is useful as an image analysis apparatus and the like.

What is claimed is:

1. A method of operation of an image analysis apparatus comprising:
    acquiring an image attached to consumer generated media data (CGM) from an external apparatus with an image acquiring unit;
    detecting a product from the image based on one or more pieces of product specifying image information with a product identifier acquiring unit;
    acquiring one or more personal attribute values of a person from the image, with a personal attribute value acquiring unit;
    acquiring a location type identifier from one or more objects in the image for identifying a location in the image, with a location type identifier acquiring unit;
    accumulating personal attribute value-related information, with a personal attribute value-related information accumulating unit, in association with the detected product, the personal attribute value-related information being information related to the one or more acquired personal attribute values;
    accumulating location type-related information, with a location type-related information accumulating unit, in association with the detected product, the location type-related information being information related to the acquired location type identifier;
    statistically processing the accumulated personal attribute value-related information with respect to the detected product;
    statistically processing the accumulated location type-related information with respect to the detected product;
    outputting a result of the statistically processed personal attribute value-related information corresponding to the detected product; and
    outputting a result of the statistically processed location type-related information corresponding to the detected product.

2. The method as claimed in claim 1 further comprising acquiring an event type identifier based on the one or more personal attribute values.

3. The method as claimed in claim 1 further comprising acquiring an event type identifier based on the location type identifier.

4. The method as claimed in claim 1 further comprising:
    acquiring an event type identifier based on the one or more personal attribute values and the location type identifier; and
    wherein
        accumulating the location type-related information includes identifying the event type identifier.

5. The method as claimed in claim 1 wherein detecting the product includes determining whether the image contains more than one product.

6. The method as claimed in claim 1 wherein acquiring the one or more personal attribute values of the person includes determining whether the image contains more than one person.

7. The method as claimed in claim 1 wherein acquiring the one or more personal attribute values includes performing face recognition.

8. The method as claimed in claim 1 further comprising storing the one or more pieces of product specifying image information in a product information storage unit.

9. The method as claimed in claim 1 wherein acquiring the one or more personal attribute values includes acquiring the one or more personal attribute values based on a sex, an age, a race, an emotional expression, or a combination thereof.

10. An image analysis apparatus comprising:
    an acquiring unit configured to:
        acquire an image attached to consumer generated media data (CGM) from an external apparatus;
        detect a product from the image based on one or more pieces of product specifying image information;
        acquire one or more personal attribute values of a person from the image; and
        acquire a location type identifier from one or more objects in the image for identifying a location in the image; and
    an accumulating unit, coupled to the acquiring unit, configured to:
        accumulate personal attribute value-related information in association with the detected product, the personal attribute value-related information being information related to the one or more acquired personal attribute values;
        accumulate location type-related information in association with the detected product, the location type-related information being information related to the acquired location type identifier;
        statistically process the accumulated personal attribute value-related information with respect to the detected product;
        statistically process the accumulated location type-related information with respect to the detected product;
        output a result a the statistically processed personal attribute value-related information corresponding to the detected product; and
        output a result of the statistically processed location type-related information corresponding to the detected product.

11. The apparatus as claimed in claim 10 wherein the acquiring unit is further configured to acquire an event type identifier based on the one or more personal attribute values.

12. The apparatus as claimed in claim 10 wherein the acquiring unit is further configured to acquire an event type identifier based on the location type identifier.

13. The apparatus as claimed in claim 10 wherein the acquiring unit is further configured to:
    acquire an event type identifier based on acquiring an event type identifier based on the one or more personal attribute values and the location type identifier; and
    wherein
        accumulating the location type-related information includes identifying the event type identifier.

14. A non-transitory computer readable medium including instructions for an image analysis apparatus comprising:
    acquiring an image attached to consumer generated media data (CGM) from an external apparatus;
    detecting a product from the image based on one or more pieces of product specifying image information;
    acquiring one or more personal attribute values of a person from the image;

acquiring a location type identifier from one or more objects in the image for identifying a location in the image;

accumulating personal attribute value-related information in association with the detected product, the personal attribute value-related information being information related to the one or more acquired personal attribute values;

accumulating location type-related information in association with the detected product, the location type-related information being information related to the acquired location type identifier;

statistically processing the accumulated personal attribute value-related information with respect to the detected product;

statistically processing the accumulated location type-related information with respect to the detected product;

outputting a result of the statistically processed personal attribute value-related information corresponding to the detected product; and output a result of the statistically processed location type-related information corresponding to the detected product.

15. The non-transitory computer readable medium as claimed in claim 14 further comprising acquiring an event type identifier based on the one or more personal attribute values.

16. The non-transitory computer readable medium as claimed in claim 14 further comprising acquiring an event type identifier based on the location type identifier.

17. The non-transitory computer readable medium as claimed in claim 14 further comprising:

acquiring an event type identifier based on one or more personal attribute values and the location type identifier; and wherein accumulating the location type-related information includes identifying the event type identifier.

* * * * *